United States Patent
Muruganathan et al.

(10) Patent No.: US 11,212,682 B2
(45) Date of Patent: Dec. 28, 2021

(54) SHARED CHANNEL REMAPPING IN A MULTIPLE RADIO ACCESS TECHNOLOGY CO-EXISTENCE SCENARIO

(71) Applicant: Telefonaktiebolaget LM Ericsson (publ), Stockholm (SE)

(72) Inventors: Siva Muruganathan, Stittsville (CA); Sebastian Faxér, Järfälla (CA); Mattias Frenne, Uppsala (SE); Shiwei Gao, Nepean (CA); Stephen Grant, Pleasanton, CA (US); Robert Mark Harrison, Grapevine, TX (US)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 65 days.

(21) Appl. No.: 16/625,069

(22) PCT Filed: Jun. 27, 2018

(86) PCT No.: PCT/IB2018/054776
§ 371 (c)(1),
(2) Date: Dec. 20, 2019

(87) PCT Pub. No.: WO2019/003156
PCT Pub. Date: Jan. 3, 2019

(65) Prior Publication Data
US 2020/0154281 A1    May 14, 2020

Related U.S. Application Data

(60) Provisional application No. 62/525,659, filed on Jun. 27, 2017.

(51) Int. Cl.
*H04W 72/04* (2009.01)
*H04W 16/14* (2009.01)
*H04L 5/00* (2006.01)

(52) U.S. Cl.
CPC ........... *H04W 16/14* (2013.01); *H04L 5/0007* (2013.01); *H04L 5/0094* (2013.01); *H04W 72/042* (2013.01)

(58) Field of Classification Search
CPC ... H04W 16/14; H04W 72/04; H04W 72/042; H04L 5/00; H04L 5/0094; H04L 5/0007
See application file for complete search history.

(56) References Cited

U.S. PATENT DOCUMENTS

2013/0208587 A1    8/2013    Bala et al.
2014/0335883 A1    11/2014    Se et al.
(Continued)

FOREIGN PATENT DOCUMENTS

CN    102893648 A    1/2013
CN    104247488 A    12/2014
(Continued)

OTHER PUBLICATIONS

Russian Decision to Grant and English translation thereof, dated Apr. 2, 2020 issued in corresponding Russian Application No. 2020102856, consisting of 20 pages.
(Continued)

*Primary Examiner* — Chi Ho A Lee
(74) *Attorney, Agent, or Firm* — Christopher & Weisberg, P.A.

(57) ABSTRACT

A user equipment, base station and methods are provided. The user equipment includes processing circuitry configured to obtain an indication of a resource mapping for a first radio access technology, RAT, that allows for co-existence with a second RAT within at least a portion of a transmission band, and determine communication resources based on the obtained resource mapping indication.

19 Claims, 16 Drawing Sheets

(56) References Cited

U.S. PATENT DOCUMENTS

| | | | |
|---|---|---|---|
| 2017/0142592 A1 | 5/2017 | Fischer et al. | |
| 2018/0034613 A1* | 2/2018 | Liu | H04L 5/0094 |
| 2018/0070369 A1* | 3/2018 | Papasakellariou | H04W 16/14 |
| 2018/0124790 A1* | 5/2018 | Yerramalli | H04W 16/14 |
| 2018/0287760 A1* | 10/2018 | Choi | H04L 5/0094 |
| 2019/0090218 A1* | 3/2019 | Noh | H04L 5/0062 |
| 2019/0334680 A1* | 10/2019 | Li | H04L 5/0091 |
| 2019/0394007 A1* | 12/2019 | Wu | H04B 7/0626 |
| 2020/0008247 A1* | 1/2020 | Kwak | H04W 74/004 |
| 2020/0067676 A1* | 2/2020 | Yl | H04W 72/042 |
| 2020/0153672 A1* | 5/2020 | Choi | H04W 72/042 |
| 2020/0288482 A1* | 9/2020 | Yl | H04L 5/0053 |
| 2021/0119753 A1* | 4/2021 | Au | H04L 5/0053 |

FOREIGN PATENT DOCUMENTS

| | | |
|---|---|---|
| CN | 104350695 A | 2/2015 |
| CN | 105141391 A | 12/2015 |
| CN | 103238368 A | 2/2017 |
| CN | 106538018 A | 3/2017 |
| CN | 106797300 A | 5/2017 |
| RU | 2 580 062 C2 | 6/2012 |
| WO | 2012/174428 A1 | 12/2012 |
| WO | 2014/031344 A1 | 2/2014 |
| WO | 2016/056980 A1 | 4/2016 |
| WO | 2016/130175 A1 | 8/2016 |
| WO | 2017/027798 A1 | 2/2017 |

OTHER PUBLICATIONS

3GPP TS 36.211 3rd Generation Partnership Project; Technical Specification Group Radio Access Network; Evolved Universal Terrestrial Radio Access (E-UTRA); Physical Channels and Modulation (Release 14); V14.3.0 (Jun. 2017), consisting of 195 pages.
3GPP TS 36.212 3rd Generation Partnership Project; Technical Specification Group Radio Access Network; Evolved Universal Terrestrial Radio Access (E-Utra); Multiplexing and Channel Coding (Release 14); V14.3.0 (Jun. 2017), consisting of 198 pages.
3GPP TS 36.213 3rd Generation Partnership Project; Technical Specification Group Radio Access Network; Evolved Universal Terrestrial Radio Access (E-UTRA); Physical Layer Procedures (Release 14); V14.3.0 (Jun. 2017), consisting of 460 pages.
3GPP TS 36.321 3rd Generation Partnership Project; Technical Specification Group Radio Access Network; Evolved Universal Terrestrial Radio Access (E-UTRA); Medium Access Conlrol (MAC) Protocol Specification (Release 14) V14.3.0 (Jun. 2017), consisting of 107 pages.
Apple Inc: "Uplink Transmission in NR NSA mode", 3GPP Draft; R1-1710904, vol. RAN WG1, Jun. 26, 2017 (Jun. 26, 2017), XP051300105.
Invitation to Pay Additional Fees and, Where Applicable, Protest Fee dated Sep. 21, 2018 issued in PCT Application No. PCT/IB2018/054776, consisting of 16 pages.
Notification of Transmittal of the International Search Report and the Written Opinion of the International Searching Authority, or the Declaration dated Nov. 15, 2018 issued in PCT Application No. PCT/IB2018/054776, consisting of 19 pages.
Written Opinion of the International Preliminary Examining Authority dated Jun. 6, 2019 issued in PCT Application No. PCT/IB2018/054776, consisting of 9 pages.
Notification of Transmittal of the International Preliminary Report on Patentability dated Sep. 25, 2019 issued in PCT Application No. PCT/IB2018/054776, consisting of 22 pages.
Indian First Examination Report dated Apr. 19, 2021, issued in corresponding Indian Application No. 202047003256, consisting of 7 pages.
Japanese Office Action dated Mar. 15, 2021 and English Summary of the Japanese Office Action issued in corresponding Japanese Application No. 2019-571628, consisting of 5 pages.
Ericsson: "On Rate Matching"; 3GPP TSG-RAN WG1 NR Ad-Hoc#2; R1-1711014; Agenda Item: 5.1.2.1.7; Document for: Discussion and Decision; Qingdao, China Jun. 27-30, 2017, consisting of 4 pages.
Ericsson: Reserved Resources Supporting NR Co-Existence with LTE and NB-IoT; R1-1710912; Agenda Item: 5.1.8 Document for: Discussion and Decision; Qingdao, China, Jun. 27-30, 2017, consisting of 7 pages.
3GPP TSG RAN WG1 NR Ad-Hoc Meeting R1-1700402; Title: Consideration of NR signals and channels mapping around LTE CRS; Agenda Item: 5.1.3.3; Source: Huawei, HiSilicon; Document for: Discussion and decision; Spokane, USA; Jan. 16-20, 2017; consisting of 2 pages.
3GPP TSG RAN WG1 Meeting NR-AH1 R1-1700498; Title: Indication of blank resource; Agenda Item: 5.1.3.1; Source: LG Electronics; Document for: Discussion and decision; Spokane, USA, Jan. 16-20, 2017, consisting 3 pages.
3GPP TSG RAN meeting #75 RP-170376; Study Item Name: Study on New Radio Access Technology; Agenda Item: 9.2.1; Dubrovnik, Croatia, Mar. 6-9, 2017 consisting of 157 pages.

* cited by examiner

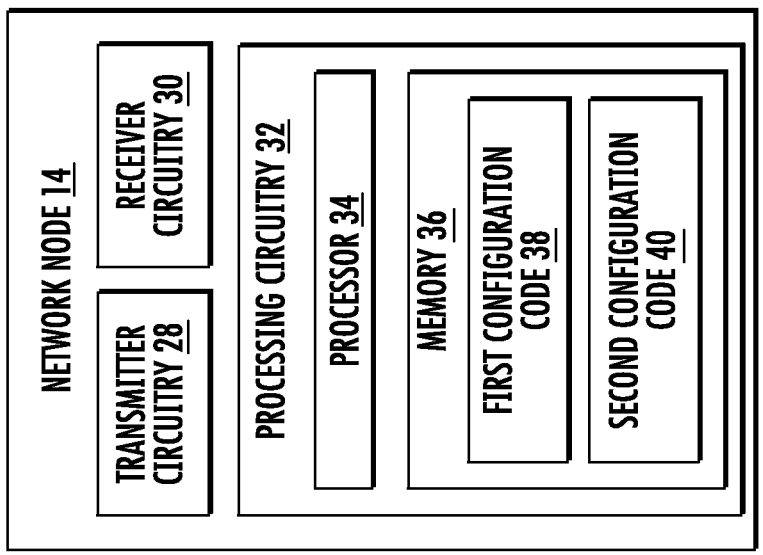
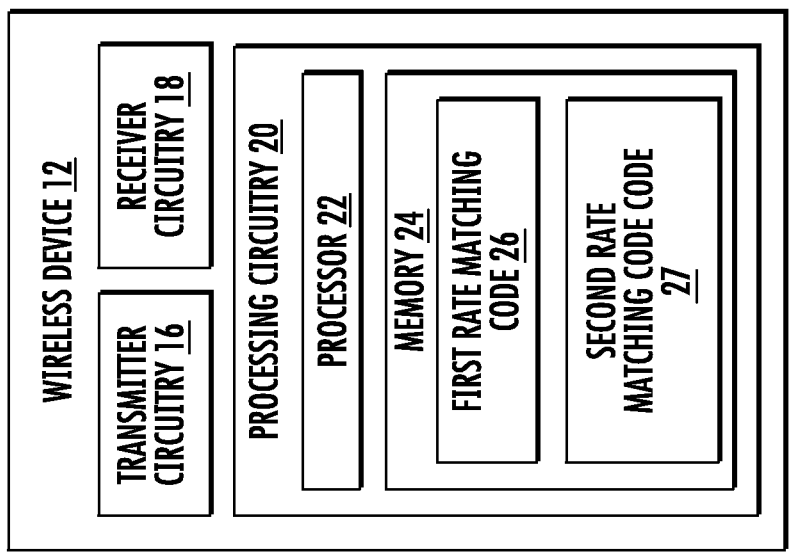
FIG. 8

SHARED CHANNEL REMAPPING IN A MULTIPLE RADIO ACCESS TECHNOLOGY CO-EXISTENCE SCENARIO

CROSS-REFERENCE TO RELATED APPLICATIONS

This Application is a Submission Under 35 U.S.C. § 371 for U.S. National Stage Patent Application of International Application No.: PCT/IB2018/054776, filed Jun. 27, 2018 entitled "SHARED CHANNEL REMAPPING IN A MULTIPLE RADIO ACCESS TECHNOLOGY CO-EXISTENCE SCENARIO," which claims priority to U.S. Provisional Application No. 62/525,659, filed Jun. 27, 2017, entitled "PDSCH REMAPPING IN NR AND LTE CO-EXISTENCE SCENARIO," the entireties of both of which are incorporated herein by reference.

TECHNICAL FIELD

This disclosure relates to wireless communication, and in particular to a method, wireless device and network node for rate matching using dynamically indicated reference signals in a co-carrier co-existence scenario.

BACKGROUND

Next generation mobile wireless communication systems such as 5G or new Radio (NR) support a diverse set of use cases and a diverse set of deployment scenarios. The latter includes deployment at both low frequencies (100s of MHz), similar to Long Term Evolution (LTE) today, and very high frequencies (mm waves in the tens of GHz).

Long Term Evolution (LTE) uses Orthogonal Frequency Division Multiplexing (OFDM) in the downlink and Discrete Fourier Transform (DFT)-spread OFDM in the uplink. The basic LTE downlink physical resource can thus be considered in a time-frequency grid as illustrated in FIG. 1 that is a block diagram of LTE downlink resources, where each resource element corresponds to one OFDM subcarrier during one OFDM symbol interval.

Similar to LTE, NR will use OFDM in the downlink (i.e., from a network node such as gNB, eNB, or base station, to a wireless device (i.e., user equipment or terminal)). In the uplink (i.e., from wireless device to network node), both DFT-spread OFDM and OFDM will be supported.

The basic NR physical resource is a time-frequency grid similar to the one in LTE as illustrated in FIG. 1 (LTE physical resources), where each resource element corresponds to one OFDM subcarrier during one OFDM symbol interval. Although a subcarrier spacing of $\Delta f = 15$ kHz may be used for the arrangement shown in FIG. 1, different subcarrier spacing values are supported in NR. The supported subcarrier spacing values (also referred to as different numerologies) in NR are given by $\Delta f = (15 \times 2^\alpha)$ kHz where $\alpha$ is a non-negative integer.

Furthermore, the resource allocation in LTE is typically described in terms of resource blocks (RBs), where a resource block (RB) corresponds to one slot (0.5 ms) in the time domain and twelve contiguous subcarriers in the frequency domain. Resource blocks are numbered in the frequency domain starting with zero from one end of the system bandwidth. For NR, a resource block is also twelve subcarriers in frequency but for further study in the time domain. A RB is also referred to as physical RB (PRB).

In the time domain, LTE downlink transmissions are organized into radio frames of 10 ms, each radio frame consisting of ten equally-sized subframes of length $T_{subframe} = 1$ ms as shown in FIG. 2, where FIG. 2 is a block diagram of an LTE time-domain structure with 15 kHz subcarrier spacing. Each subframe is further divided into two slots each with 7 OFDM symbols in a normal cyclic prefix configuration. A similar frame structure will also be used in NR, in which the subframe length is fixed at 1 ms regardless of the sub-carrier spacing used. The number of slots per subframe depends on the subcarrier spacing configured. The slot duration for $(15 \times 2^\alpha)$ kHz subcarrier spacing is given by $2^{-\alpha}$ ms assuming 14 OFDM symbols per slot.

Downlink transmissions are dynamically scheduled, i.e., in each subframe the base station transmits downlink control information (DCI) regarding transmitted terminal data such as in which resource blocks the data is transmitted, in the current downlink subframe. In LTE, this control signaling is typically transmitted in the first 1, 2, 3 or 4 OFDM symbols in each subframe. A downlink LTE system with 3 OFDM symbols as control is illustrated in FIG. 3. In NR, this control signaling is typically transmitted in the first few OFDM symbols in each slot. The control information is carried on the Physical Downlink Control Channel (PDCCH) and data is carried on the Physical Downlink Shared Channel (PDSCH). A terminal detects and decodes the PDCCH and if the PDCCH is decoded successfully, then the terminal decodes the corresponding PDSCH based on the decoded control information in the PDCCH. Each terminal is assigned a unique Cell Radio Network Temporary Identifier (C-RNTI) in the same serving cell. The cyclic redundancy check (CRC) bits of a PDCCH for a terminal is scrambled by the terminal's C-RNTI, so the terminal recognizes the PDCCH by checking the C-RNTI used to scramble the CRC (cyclic redundancy check) bits of the PDCCH.

Physical Channels and Transmission Modes

In LTE, a number of physical downlink (DL) channels are supported. A downlink physical channel corresponds to a set of resource elements carrying information originating from higher layers. The following are some of the physical channels supported in LTE:

Physical Downlink Shared Channel, PDSCH;
Physical Downlink Control Channel, PDCCH; and
Enhanced Physical Downlink Control Channel, EPDCCH.

The PDSCH is used for carrying user traffic data and higher layer messages. The PDSCH is transmitted in a downlink (DL) subframe outside of the control region as shown in FIG. 3 that is a block diagram of physical channels and transmission modes. Both the PDCCH and the EPDCCH are used to carry Downlink Control Information (DCI) such as PRB allocation, modulation level and coding scheme (MCS), precoder used at the transmitter, and etc. The PDCCH is transmitted in the first one to four OFDM symbols in a DL subframe, i.e., the control region, while the EPDCCH is transmitted in the same region as the PDSCH.

Similarly, in LTE, the following physical uplink (UL) channels are supported:

Physical Uplink Shared Channel, PUSCH; and
Physical Uplink Control Channel, PUCCH.

Different DCI formats are defined in LTE for DL and UL data scheduling. For example, DCI formats 0 and 4 are used for UL data scheduling while DCI formats 1, 1A, 1B, 1C, 1D, 2, 2A, 2B, 2C and 2D [2] are used for DL data scheduling. In DL, which DCI format is used for data scheduling is associated with a DL transmission scheme and/or the type of message to be transmitted. The following are some of the transmission schemes supported in LTE:

Single-antenna port;
Transmit diversity (TxD);
Open-loop spatial multiplexing;
Close-loop spatial multiplexing; and
Up to 8 layer transmission.

The PDCCH is transmitted with either the single-antenna port or Transmit Diversity scheme while the PDSCH can use any one of the transmission schemes. In LTE, a wireless device is configured with a transmission mode (TM), rather than a transmission scheme. There are 10 TMs, i.e., TM1 to TM10, defined so far for the PDSCH in LTE. Each TM defines a primary transmission scheme and a backup transmission scheme. The backup transmission scheme is either single antenna port or TxD. Following is a list of some primary transmission schemes in LTE:

TM1: single antenna port, port 0;
TM2: TxD;
TM3: open-loop SM;
TM4: closed-loop SM;
TM9: up to 8 layer transmission, port 7-14; and
TM10: up to 8 layer transmission, port 7-14.

In TM1 to TM6, a cell specific reference signal (CRS) is used as the reference signal for both channel state information feedback and for demodulation at a wireless device. In TM7 to TM10, a wireless device specific demodulation reference signal (DMRS) is used as the reference signal for demodulation.

LTE Mechanisms for Control Signaling

LTE control signalling can be carried in a variety of ways, including carrying control information on the PDCCH or the PUCCH, embedded in the PUSCH, in medium access control (MAC) control elements ("MAC CEs"), or in radio resource control (RRC) signalling. Each of these mechanisms is customized to carry a particular kind of control information.

In LTE, control information carried on the PDCCH, or the PUCCH, or embedded in the PUSCH is physical layer related control information, such as downlink control information (DCI), uplink control information (UCI), as described in Third Generation Partnership Project (3GPP) Technical Specification (TS) 36.211, 36.212, and 36.213. DCI is generally used to instruct the wireless device to perform some physical layer function, providing the needed information to perform the function. UCI generally provides the network with needed information, such as a hybrid automatic repeat request acknowledgment (HARQ-ACK), scheduling request (SR), channel state information (CSI), including channel quality indicator (CQI), preceding matrix indicator (PMI), rank indicator (RI), and/or CSI resource indicator (CRI). UCI and DCI can be transmitted on a subframe-by-subframe basis, and so are designed to support rapidly varying parameters, including those that can vary with a fast fading radio channel. Because UCI and DCI can be transmitted in every subframe, UCI or DCI corresponding to a given cell tends to be on the order of tens of bits, in order to limit the amount of control overhead.

Control information carried in MAC CEs is carried in MAC headers on the uplink and downlink shared transport channels (UL-SCH and DL-SCH), for example as described in 3GPP TS 36.321. Since a MAC header does not have a fixed size, control information in MAC CEs can be sent when control information is needed, and does not necessarily represent a fixed overhead. Furthermore, MAC CEs can carry larger control payloads efficiently, since they are carried in UL-SCH or DL-SCH transport channels, which benefit from link adaptation, HARQ, and can be turbo coded (whereas UCI and DCI are not in 3GPP Release-13 (Rel-13)). MAC CEs are used to perform repetitive tasks that use a fixed set of parameters, such as maintaining timing advance or buffer status reporting, but these tasks generally do not require transmission of a MAC CE on a subframe-by-subframe basis. Consequently, channel state information related to a fast fading radio channel, such as PMI, CQI, RI, and CRI are not carried in MAC CEs in Rel-13.

Channel State Information Reference Signal (CSI-RS) in LTE

In LTE 3GPP Release-10, a new channel state information reference signal (CSI-RS) was introduced with the intent of allowing channel state information estimation. The CSI-RS based CSI feedback provides several advantages over the CRS based CSI feedback used in previous releases. First, the CSI-RS is not used for demodulation of the data signal, and thus does not require the same density (i.e., the overhead of the CSI-RS is substantially less). Second, CSI-RS provides a more flexible way to configure CSI feedback measurements (e.g., which CSI-RS resources to be measured can be configured in a wireless device specific manner).

Two types of CSI-RS are defined in LTE: non-zero power (NZP) CSI-RS and zero power (ZP) CSI-RS. NZP CSI-RS is transmitted by a network node (or eNB) for wireless devices to estimate the downlink channels to the network node. For ZP CSI-RS, one or more CSI-RS resource(s) is/are allocated by the network node but nothing is transmitted on the resources, which can be used to reduce interferences to neighbor cells so that better channel estimation can be performed by the wireless devices in the neighbor cells.

For a 3GPP Rel-13 wireless device, the quantity of supported antenna ports are 1, 2, 4, 8, 12 and 16. In 3GPP Rel-14, the antenna port quantities have been increased to include 20, 24, 28 and 32 ports. FIG. 4 is a block diagram of REs available for CSI-RS allocations in a PRB. Up to 40 REs can be configured for CSI-RS. CSI-RS is transmitted over all PRBs. Note that CSI-RS signals are transmitted in all RBs of a system bandwidth, so the same resource allocation is repeated in all RBs. In Rel-14 LTE, CSI-RS can also be transmitted with reduced density. That is, the CSI-RS signals corresponding to different ports are transmitted in every $N^{th}$ PRB.

Until 3GPP LTE Release 13, CSI-RS was transmitted periodically on certain subframes, also referred to as CSI-RS subframes. An LTE CSI-RS subframe configuration consists of a subframe periodicity and a subframe offset. The periodicity is configurable at 5, 10, 20, 40 and 80 ms. An LTE CSI-RS configuration includes a CSI-RS resource configuration as may be specified in Table 6.10.5.2-1 of 3GPP TS36.211 and a CSI-RS subframe configuration as may be specified in Table 6.10.5.3-1 of 3GPP TS36.211.

In 3GPP LTE Release 14, aperiodic CSI-RS was introduced, in which only the CSI-RS resource configured is applicable, and unlike in the conventional CSI-RS configuration, the subframe configuration is applicable. Also, a wireless device can be preconfigured with K={1, 2, . . . , 8} CSI-RS resources.

One of the motivations for aperiodic CSI-RS is that the transmission of CSI-RS can occur in any subframe in order for a wireless device to measure and feedback downlink CSI, and the aperiodic CSI-RS does not have to be limited to a set of preconfigured subframes. Another motivation is to be able to reduce CSI-RS overhead in the presence of a large number of wireless devices. For instance, if a large number of wireless devices are present, allocated periodic CSI-RS resources to each wireless device in a wireless device-specific manner will consume a large number of REs and will drive the CSI-RS overhead up. The CSI-RS overhead can be reduced by aperiodic CSI-RS with a pool of CSI-RS resources where the pool can contain a maximum of K resources. The CSI-RS resource pool containing multiple CSI-RS resources can be shared among a group of wireless devices in which precoded or beamformed CSI-RS for targeting different wireless devices can be transmitted at different subframes by sharing the common CSI-RS resource pool. The presence of CSI-RS and a CSI measurement request can be dynamically triggered in DCI such as an uplink data grant message to the targeted wireless devices for CSI measurement and report. An example is shown FIG. 5. FIG. 5 is a block diagram of an example of dynamic indication of aperiodic CSI-RS via DCI. In the dynamic aperiodic CSI-RS indication, the wireless device is told to measure CSI in the subframe, and the wireless device receives the indication and on which one of the preconfigured CSI-RS resources the wireless device should measure CSI on. The wireless device measures CSI on the indicated CSI-RS resource and feeds back the CSI to the wireless device and/or network node.

In some cases, not all K preconfigured CSI-RS resource may be needed, for instance if the load is varying. Hence, in this case a number N<K of CSI-RS resources may be activated in a more dynamic way to cope with the varying load in the system. If N among the K CSI-RS resources are activated in the wireless device, the wireless device can expect to receive aperiodic CSI-RS in one of the N activated CSI-RS resources. In 3GPP LTE release 14, the activation of N out of K resources can be done via MAC CE signaling. The N activated CSI-RS resources can be deactivated by another MAC CE signal at a later time. FIG. 6 is a block diagram of an example of activation/deactivation of aperiodic CSI-RS resources by MAC CE and dynamic indication of aperiodic CSI-RS via DCI in LTE.

Channel State Information Reference Signal (CSI-RS) in NR

Similar to LTE, in NR a unique reference signal is transmitted from each antenna port at the network node for downlink channel estimation at a wireless device. Reference signals for downlink channel estimation are commonly referred to as channel state information reference signals (CSI-RS). For N antenna ports, there are N CSI-RS signals, each associated with one antenna port.

By measuring on CSI-RS, a wireless device can estimate the effective channel that the CSI-RS is traversing including the radio propagation channel and antenna gains at both the network node and the wireless device. Mathematically, this implies that if a known CSI-RS signal $x_i$ (i=1, 2, . . . , $N_{tx}$) is transmitted on the $i^{th}$ transmit antenna port at the network node, the received signal $x_j$ (i=1, 2, . . . , $N_{rx}$) on the $j^{th}$ receive antenna port of a wireless device can be expressed as $$y_j = h_{i,j} x_i n_j$$

where $h_{i,j}$ is the effective channel between the $i^{th}$ transmit antenna port and the $j^{th}$ receive antenna port, $n_j$ is the receiver noise associated with the $j^{th}$ receive antenna port, $N_{tx}$ is the number of transmit antenna ports at the gNB and $N_{rx}$ is the number of receive antenna ports at the terminal.

A wireless device can estimate the $N_{rx} \times N_{tx}$ effective channel matrix H (H(i,j)=$h_{i,j}$) and thus the channel rank, precoding matrix, and channel quality. This is achieved by using a predesigned codebook for each rank, with each codeword in the codebook being a precoding matrix candidate. A wireless device searches through the codebook to find a rank, a codeword associated with the rank, and channel quality associated with the rank and precoding matrix to best match the effective channel. The rank, the precoding matrix and the channel quality are reported in the form of a rank indicator (RI), a precoding matrix indicator (PMI) and a channel quality indicator (CQI) as part of CSI feedback. This results in so-called channel dependent precoding, or closed-loop precoding. Such precoding essentially strives to focus the transmit energy into a subspace which is strong in the sense of conveying much of the transmitted energy to the wireless device.

A CSI-RS signal is transmitted on a set of time-frequency resource elements (REs) associated with an antenna port. For channel estimation over a system bandwidth, the CSI-RS is typically transmitted over the whole system bandwidth. The set of REs used for CSI-RS transmission is referred to as CSI-RS resource. From a wireless device perspective, an antenna port is equivalent to a CSI-RS that the wireless device uses to measure the channel. Up to 32 (i.e. $N_{tx}$=32) antenna ports are supported in NR and thus 32 CSI-RS signals can be configured for a wireless device. The CSI-RS RE patterns in NR are different from the CSI-RS RE patterns in LTE.

In NR, the following three types of CSI-RS transmissions are supported:

Periodic CSI-RS Transmission: CSI-RS is transmitted periodically in certain subframes or slots. This CSI-RS transmission is semi-statically configured using parameters such as CSI-RS resource, periodicity and subframe or slot offset similar to LTE.

Aperiodic CSI-RS Transmission: This is a one-time ('one-shot') CSI-RS transmission that can happen in any subframe or slot. Here, one-shot means that CSI-RS transmission only happens once per trigger. The CSI-RS resources (i.e., the resource element locations which consist of subcarrier locations and OFDM symbol locations) for aperiodic CSI-RS are semi-statically configured. The transmission of aperiodic CSI-RS is triggered by dynamic signaling through the PDCCH. The triggering may also include selecting a CSI-RS resource from multiple CSI-RS resources.

Semi-Persistent CSI-RS Transmission: Similar to periodic CSI-RS, resources for semi-persistent CSI-RS transmissions are semi-statically configured with parameters such as periodicity and subframe or slot offset. However, unlike periodic CSI-RS, dynamic signaling is needed to activate and possibly deactivate the CSI-RS transmission. An example is shown in FIG. 7 that is a block diagram of a semi-persistent CSI-RS transmission.

Rate Matching

In LTE, a virtual circular buffer is used to match any available code rate by selecting or pruning bits in the buffer. This rate matching is useful since the number of available REs for a wireless device in a subframe may vary due to the presence or absence of various reference signals. For example, the number of REs for the PDSCH in a subframe configured with CSI-RS would be different from that in subframes without CSI-RS. The rate matching can be used to adapt the variations of the available PDSCH REs in this case. Note that in this case, both the network node and the wireless device know the exact number of available PDSCH REs and the RE locations in a RB. This PDSCH to RE mapping information is used for correct PDSCH decoding as otherwise, there could be a mismatch between the REs a PDSCH is transmitted on and the REs over which the PDSCH is received and decoded.

Rate Matching Around Aperiodic CSI-RS

One issue with aperiodic CSI-RS transmission is how to inform a wireless device scheduled with the PDSCH in a subframe about the aperiodic CSI-RS transmission to another wireless device in order to determine the correct PDSCH RE mapping in the subframe, or correct PDSCH rate matching. In LTE Release-14, this issue is solved by configuring a wireless device with higher layer parameter csi-RS-ConfigZP-Ap. When this higher layer parameter (csi-RS-ConfigZP-Ap) is configured, a wireless device is configured with 4 aperiodic ZP CSI-RS resources which are used for the purpose of PDSCH to RE mapping to the wireless device when another wireless device is receiving aperiodic CSI-RS. Which aperiodic ZP CSI-RS resource should be used for PDSCH to RE mapping is indicated via the 'Aperiodic zero-power CSI-RS resource indicator for PDSCH RE Mapping' field in DCI using Table 1 (which is extracted from Table 7.1.9-1 in 3GPP TS 36.211).

| Value of Aperiodic zero-power CSI-RS resource indicator for PDSCH RE Mapping' field | Description |
| --- | --- |
| '00' | Aperiodic zero-power CSI-RS resources 1 configured by higher layers |
| '01' | Aperiodic zero-power CSI-RS resources 2 configured by higher layers |
| '10' | Aperiodic zero-power CSI-RS resources 3 configured by higher layers |
| '11' | Aperiodic zero-power CSI-RS resources 4 configured by higher layers |

PQI Bits in DCI

In 3GPP LTE Rel-11, a wireless device configured in transmission mode 10 for a given serving cell can be configured with up to 4 parameter sets by higher layer signaling to decode PDSCH according to a detected PDCCH/EPDCCH with DCI format 2D intended for the wireless device and the given serving cell. This is because the network node may transmit PDSCH to the wireless device via different transmission points (TPs) at different times based on the channel conditions. There can be different reference signals configured for different TPs. The wireless device uses the parameter set according to the value of the 'PDSCH RE Mapping and Quasi-Co-Location indicator' (PQI) field (defined in TABLE 2—which is extracted from Table 7.1.9-1 in 3GPP TS 36.211) in the detected PDCCH/EPDCCH with DCI format 2D for determining the correct PDSCH RE mapping.

| Value of 'PDSCH RE Mapping and Quasi-Co-Location Indicator' field | Description |
| --- | --- |
| '00' | Parameter set 1 configured by higher layers |
| '01' | Parameter set 2 configured by higher layers |
| '10' | Parameter set 3 configured by higher layers |
| '11' | Parameter set 4 configured by higher layers |

The parameters for determining PDSCH RE mapping are configured via higher layer signaling for each parameter set, including:
Number of CRS ports;
CRS FreqShift; and
ZP CSI-RS configuration.

NR Co-Existence with LTE

The possibility for efficient same-frequency-band co-existence with LTE is an aspect of NR. LTE terminals are expected to remain in the networks for at least a few years. Efficient co-existence between NR and LTE supports flexible network and spectrum migration possibilities toward NR.

LTE co-existence with NR within the same spectrum may be realized with LTE and NR being deployed with frequency-overlapping carriers ("co-carrier co-existence") as well as frequency-adjacent non-overlapping carriers ("adjacent-carrier co-existence"). Among these two scenarios, the co-carrier co-existence scenario is an aspect that achieves efficient resource sharing and thus is a part of the scenario to support implementations.

SUMMARY

In some embodiments of the disclosure according to a first aspect, a network node configures an NR wireless device with a common zero power reference signal (ZP-RS) configuration which consists of multiple ZP-RS resources, and the network node sends a dynamic trigger to the NR wireless device via DCI whenever aperiodic CSI-RS is transmitted in either the LTE carrier or the NR carrier (or both). When the dynamic trigger in DCI is received, the NR wireless device rate matches around the aperiodic ZP RS configuration.

In some embodiments of the disclosure according to a second aspect, how an NR wireless device can perform PDSCH to RE mapping (i.e., rate matching) is described when the NR wireless device receives data from multiple Transmission Receptions Points (TRPs) while some of the TRPs are also serving LTE wireless devices using the whole or part of the system bandwidth. When the NR wireless device is scheduled with the PDSCH in a subframe or slot, the NR wireless device may also be dynamically signaled on whether LTE reference signals are present in the subframe or slot and if present, a rate matching resource configuration is also signaled for the PDSCH rate matching in the subframe or slot. The rate matching resource configuration is one of multiple rate matching resource configurations semi-statically configured for the NR wireless device, where each configuration contains information about REs occupied by LTE reference signals as well as REs occupied by NR reference signals in the subframe or slot.

Some embodiments include a user equipment, UE, comprising processing circuitry configured to obtain an indication of a resource mapping for a first radio access technology, RAT, that allows for co-existence with a second RAT within at least a portion of a transmission band, and determine communication resources based on the obtained resource mapping indication.

In some embodiments, the transmission band is a carrier of the first RAT. In some embodiments, the first RAT is New Radio, NR and the second RAT is Long Term Evolution, LTE. In some embodiments, the UE is a New Radio, NR, UE. In some embodiments, the determined communication resources are physical downlink shared channel, PDSCH, resources. In some embodiments, the obtained resource mapping indication is based on transmissions received from a plurality of base stations. In some embodiments, the processing circuitry is further configured to receive dynamic signaling indicating a use of zero-power reference signal, ZP-RS, which allows resource mapping in a subframe around a Long Term Evolution, LTE, reference signal that may be present in the subframe. In some embodiments, the indication of resource mapping is received in downlink control information, DCI. In some embodiments, the resource mapping indication is a trigger based on an occurrence of an aperiodic channel state information reference signal, CSI-RS, transmitted on a carrier of at least one of the first and second of the two RATs. In some embodiments, the processing circuitry is further configured to resource map around an aperiodic zero power reference signal, ZP-RS, configuration, the resource mapping being responsive to receipt of the trigger. In some embodiments, the processing circuitry is further configured to resource map a physical downlink shared channel, PDSCH, around ZP-RS resources, during the resource mapping.

According to another aspect, in some embodiments, a method for a user equipment, UE, is provided. The method includes obtaining an indication of a resource mapping for a first radio access technology, RAT, that allows for co-existence with a second RAT within at least a portion of a transmission band, and mapping communication resources based on the obtained resource mapping indication.

In some embodiments, the transmission band is a carrier of the first RAT. In some embodiments, the first RAT is New Radio, NR and the second RAT is Long Term Evolution, LTE. In some embodiments, the UE is a New Radio, NR, UE. In some embodiments, the determined communication resources are physical downlink shared channel, PDSCH, resources. In some embodiments, the obtained resource mapping indication is based on transmissions received from a plurality of base stations. In some embodiments, the method further comprises receiving dynamic signaling indicating a use of zero-power reference signal, ZP-RS, which allows resource mapping in a subframe around a Long Term Evolution, LTE, reference signal that may be present in the subframe. In some embodiments, the indication of resource mapping is received in downlink control information, DCI. In some embodiments, the resource mapping indication is a trigger based on an occurrence of an aperiodic channel state information reference signal, CSI-RS, transmitted on a carrier of at least one of a first and second of the two RATs. In some embodiments, the method further comprises resource mapping around an aperiodic zero power reference signal, ZP-RS, configuration, the resource mapping being responsive to receipt of the trigger. In some embodiments, the method further comprises resource mapping a physical downlink shared channel, PDSCH, around ZP-RS resources, during the resource mapping.

According to yet another aspect, in some embodiments, a base station includes processing circuitry configured to signal an indication of a resource mapping for a first radio access technology, RAT, that allows for co-existence with a second RAT within at least a portion of a transmission band to at least one user equipment, UE.

In some embodiments, the transmission band is a carrier of the first RAT. In some embodiments, the first RAT is New Radio, NR and the second RAT is Long Term Evolution, LTE. In some embodiments, the processing circuitry is further configured to signal to the at least one UE, an indication a use of zero-power reference signal, ZP-RS, which allows resource mapping in a subframe around a Long Term Evolution, LTE, reference signal that may be present in the subframe, wherein, optionally, the signaling is dynamic. In some embodiments, the indication is signaled in downlink control information, DCI. In some embodiments, signaling of the resource mapping indication includes sending a trigger based on an occurrence of an aperiodic channel state information reference signal, CSI-RS, transmitted on a carrier of at least one of the first and second of the two RATs.

According to another aspect, in some embodiments, a method for a base station is provided. The method includes signaling an indication of a resource mapping for a first radio access technology, RAT, that allows for co-existence with a second RAT within at least a portion of a transmission band, to at least one user equipment, UE.

In some embodiments, the transmission band is a carrier of the first RAT. In some embodiments, the first RAT is New Radio, NR and the second RAT is Long Term Evolution, LTE. In some embodiments, the method further comprises signaling to the at least one UE, an indication a use of zero-power reference signal, ZP-RS, which allows resource mapping in a subframe around a Long Term Evolution, LTE, reference signal that may be present in the subframe, wherein, optionally, the signaling is dynamic. In some embodiments, the indication is signaled in downlink control information, DCI. In some embodiments, signaling of the resource mapping indication includes sending a trigger based on an occurrence of an aperiodic channel state information reference signal, CSI-RS, transmitted on a carrier of at least one of a first and second of the two RATs.

BRIEF DESCRIPTION OF THE DRAWINGS

A more complete understanding of embodiments described herein, and the attendant advantages and features thereof, will be more readily understood by reference to the following detailed description when considered in conjunction with the accompanying drawings wherein:

FIG. 8 is a block diagram of an exemplary system for rate matching using dynamically indicated reference signals in co-carrier co-existence scenario in accordance with the principles of some embodiments of the disclosure;

DETAILED DESCRIPTION

Figure 1:
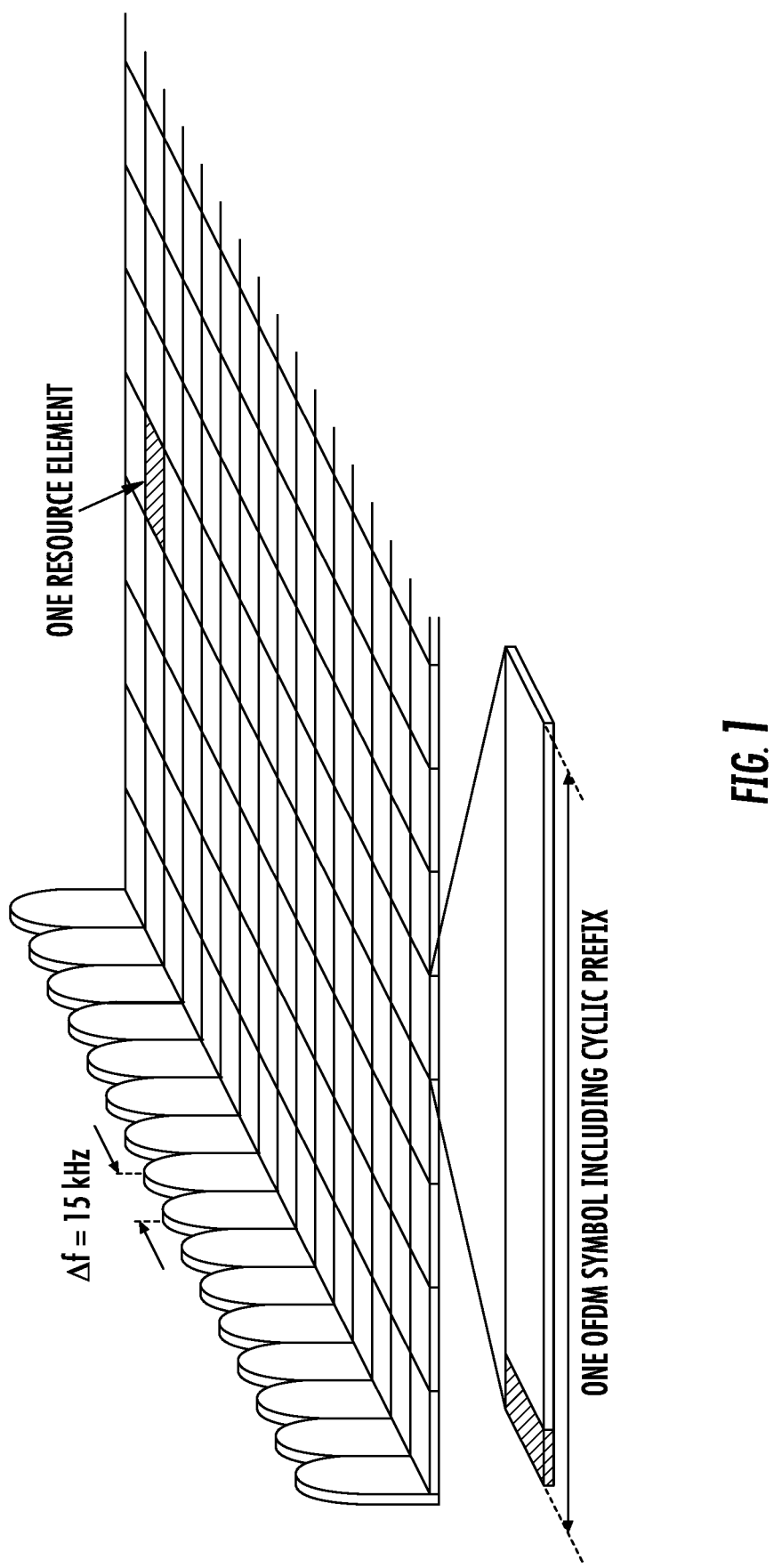
FIG. 1 that is a block diagram of LTE downlink resources.
Figure 2:
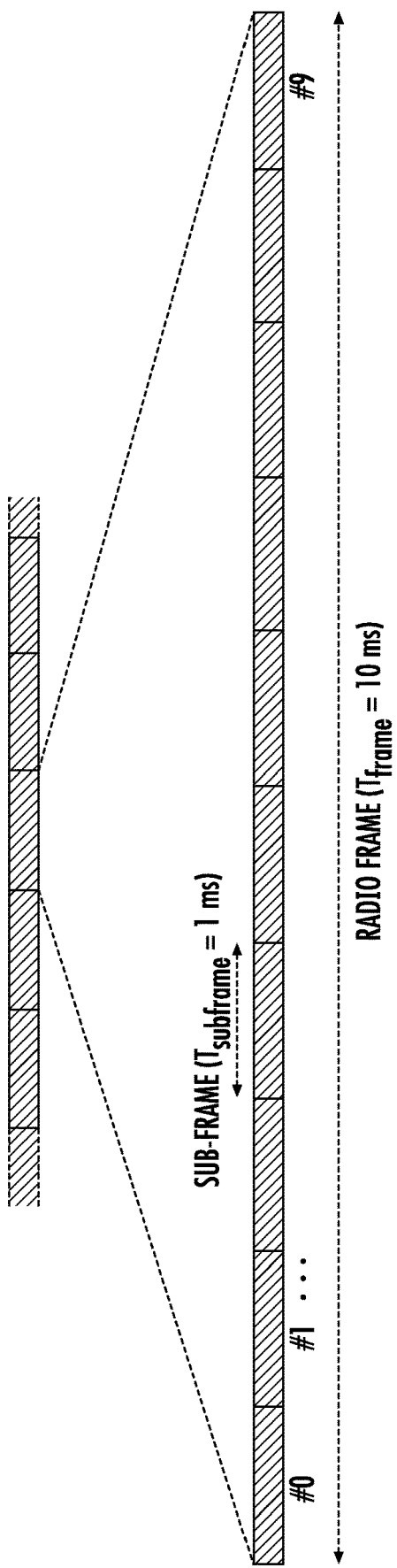
FIG. 2 is a block diagram of an LTE time-domain structure with 15 kHz subcarrier spacing.
Figure 3:
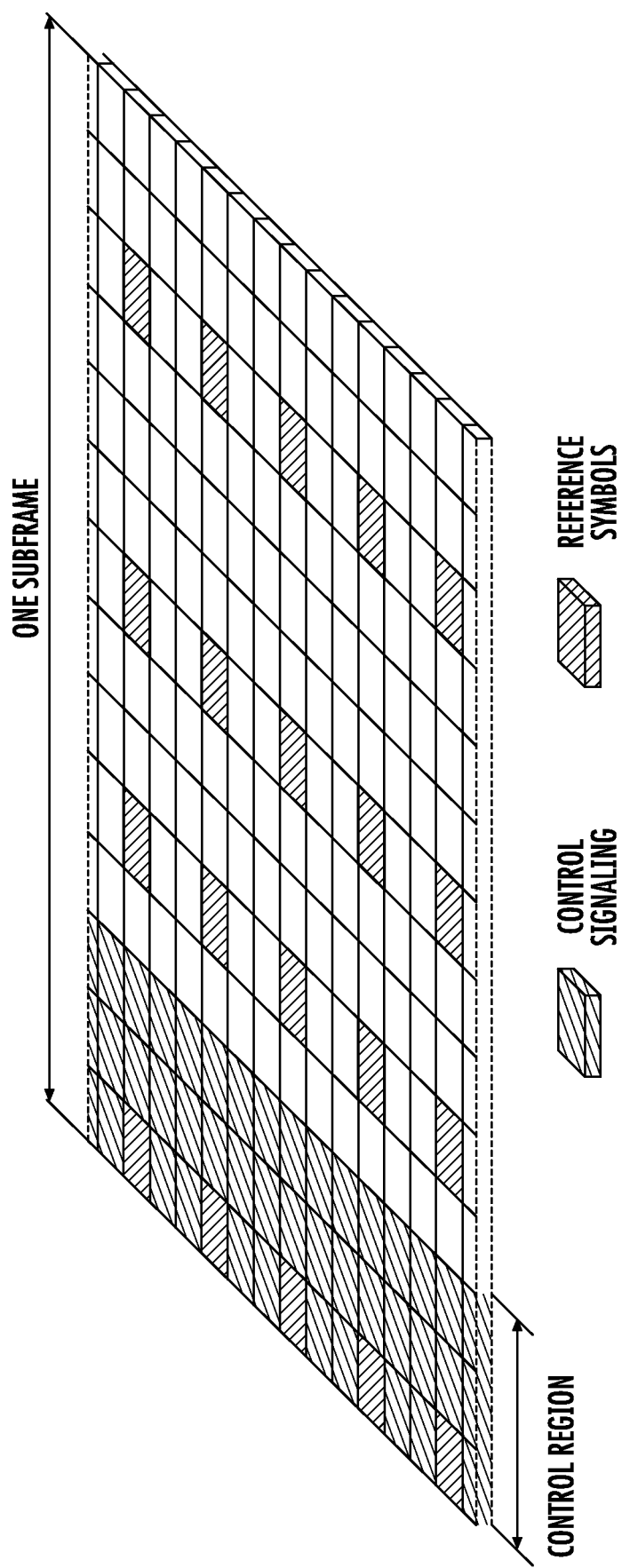
FIG. 3 is a downlink LTE system with 3 OFDM symbols for control.
Figure 4:
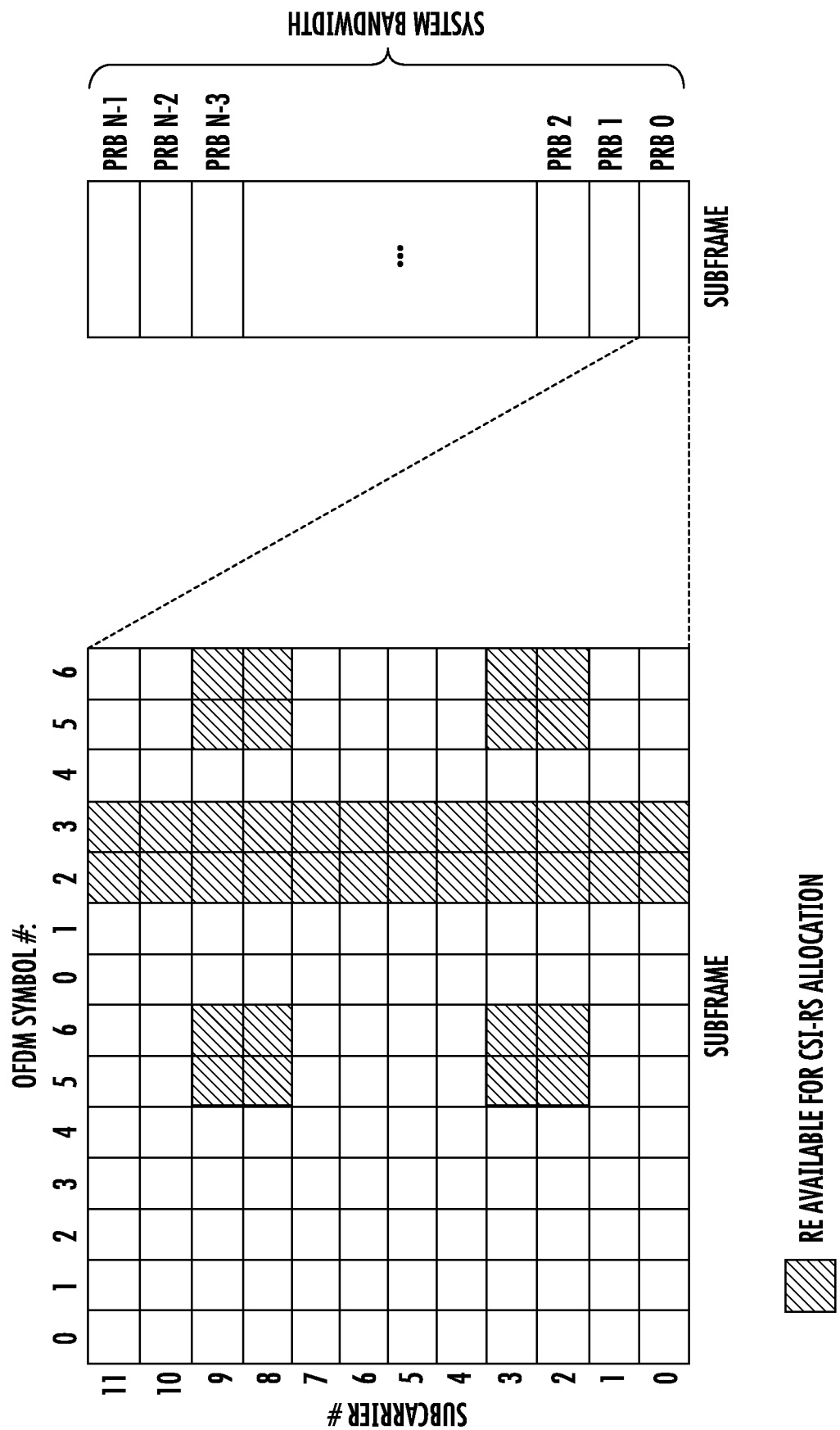
FIG. 4 is a block diagram of REs available for CSI-RS allocations in a PRB.
Figure 5:
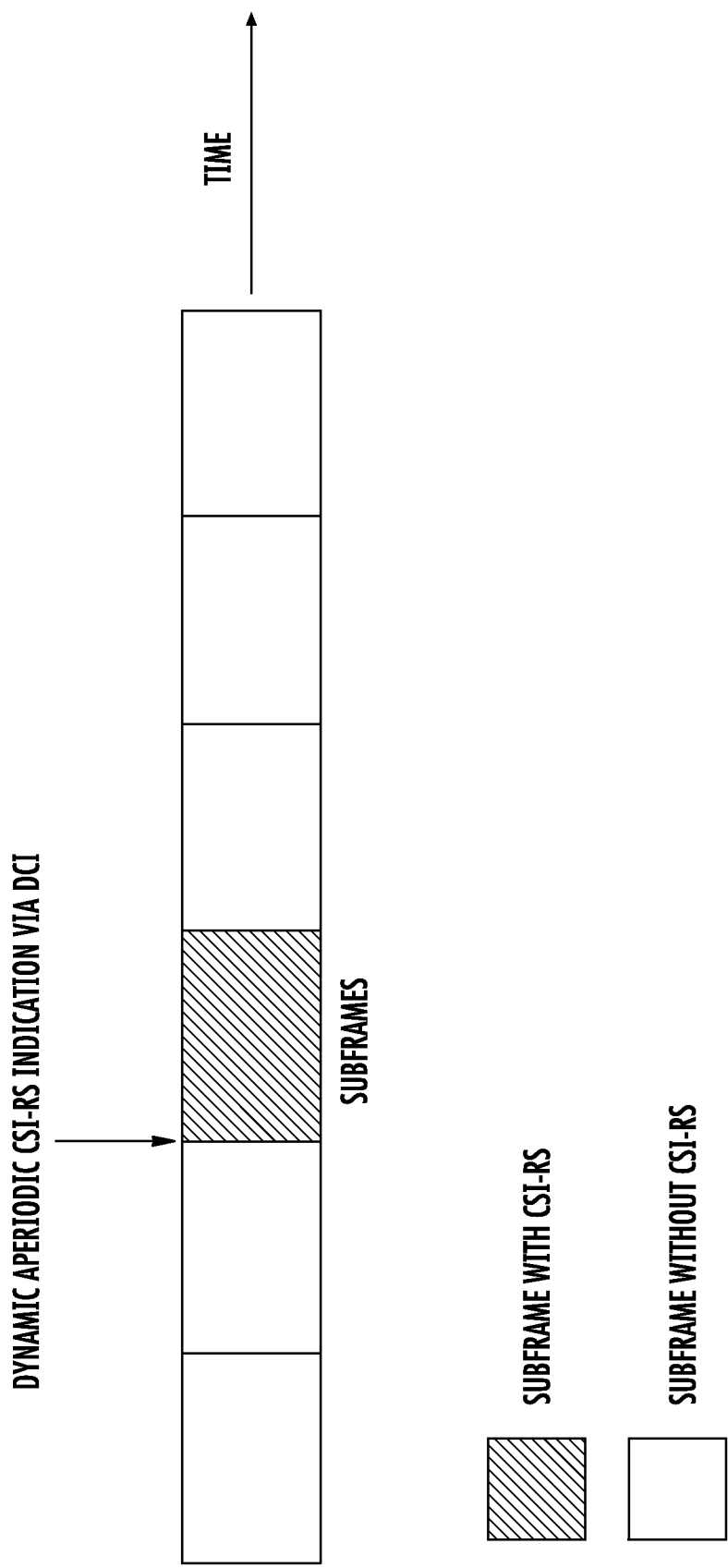
FIG. 5 is a block diagram of an example of dynamic indication of aperiodic CSI-RS via DCI.
Figure 6:
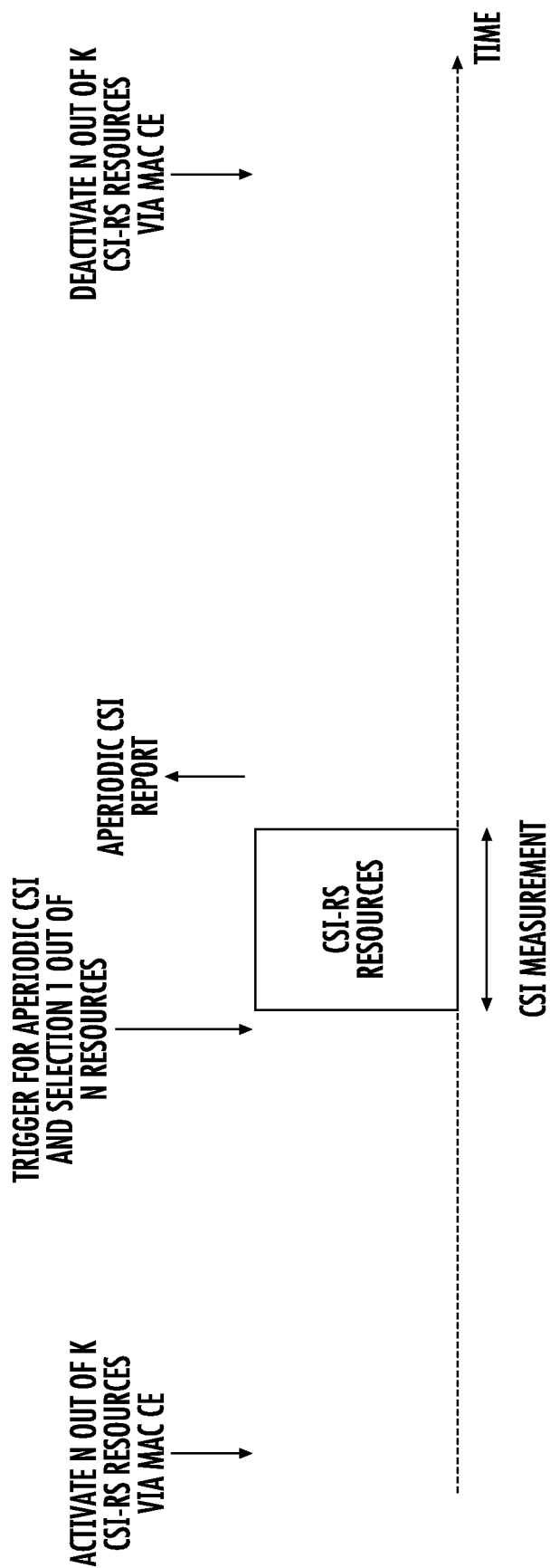
FIG. 6 is a block diagram of an example of activation/deactivation of aperiodic CSI-RS resources by MAC CE and dynamic indication of aperiodic CSI-RS via DCI in LTE.
Figure 7:
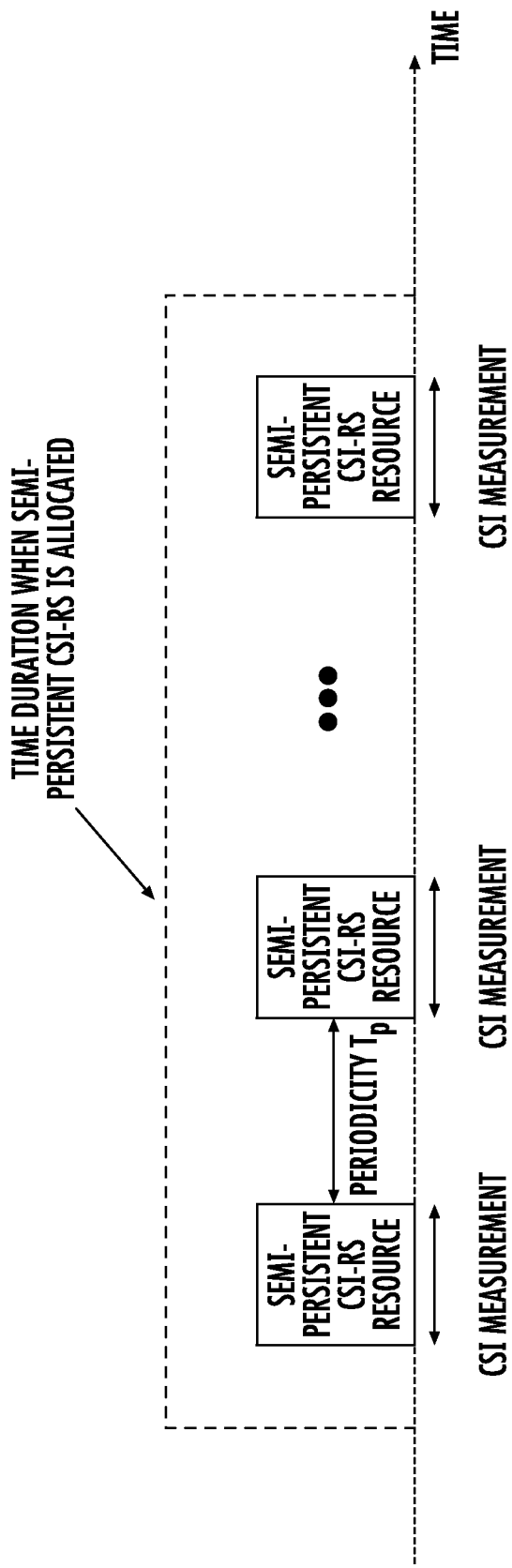
FIG. 7 is a block diagram of a semi-persistent CSI-RS transmission.

Although terminology from 3GPP long term evolution (LTE) and new radio (NR) has been used in this disclosure to exemplify the disclosure, this should not be seen as limiting the scope of the disclosure to only the aforementioned system. Other wireless systems, including WCDMA, WiMax, UMB and GSM, may also benefit from exploiting the ideas covered within this disclosure.

Also note that terminology such as eNodeB (eNB)/g Node B (gNB) and UE should be considering non-limiting and does in particular not imply a certain hierarchical relation between the two; in general, "eNB" or "gNB" could be considered as device 1 and "UE" device 2, and these two devices communicate with each other over some radio channel. Herein, we also focus on wireless transmissions in the downlink, but the disclosure is equally applicable in the uplink. Note further that the term "network node" may include a base station and the term "wireless device" or "WD" may include a user equipment (UE).

One open problem that exists in the co-carrier co-existence scenario is, when aperiodic CSI-RS is configured to the LTE wireless devices and/or to the NR wireless devices, how to inform an NR wireless device scheduled with PDSCH in a subframe or slot about the aperiodic CSI-RS transmission to another wireless device in order to determine the correct PDSCH RE mapping in the subframe or slot. A solution may be to introduce two different sets of aperiodic ZP CSI-RS resources for NR PDSCH RE mapping purposes (a first set of resources corresponding to aperiodic CSI-RS configured to LTE wireless devices and another set of resources corresponding to aperiodic CSI-RS configured to NR wireless devices) and independently indicate the two different sets via two different DCI fields. However, this will result in increased DCI overhead.

Another related open problem that exists in the co-carrier co-existence scenario is when the LTE wireless device is configured in transmission mode 10 with up to 4 parameter sets indicated by the PDSCH RE Mapping and Quasi-Co-Location Indicator field, how to inform an NR wireless device scheduled with PDSCH in a subframe or slot about the possible transmission of reference signals from different transmission points to another wireless device in order to determine the correct PDSCH RE mapping in the subframe or slot.

Some embodiments of this disclosure may solve at least some of the problems described above. One advantage that may be provided by some embodiments of the disclosure is that DCI overhead associated with PDSCH rate matching signaling can be reduced for cases involving LTE-NR co-carrier co-existence. By indicating the rate matching around both LTE reference signals and NR reference signals via a single dynamic indication, independently indicating the rate matching information via two different DCI fields (one for LTE reference signals and one for NR reference signals) can be alleviated.

According to some embodiments of the disclosure, the terms 'PDSCH to RE mapping', 'resource mapping' and 'rate matching, can be used interchangeably.

Before describing in detail exemplary embodiments, it is noted that the embodiments reside primarily in combinations of components and processing steps related to methods, controllers, nodes and switches. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first," "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

Referring again to drawing figures in which like reference designators refer to like elements there is shown in FIG. 8 is a block diagram of an exemplary system for rate matching using dynamically indicated reference signals in co-carrier co-existence scenario in accordance with the principles of some embodiments of the disclosure, the system is generally referred to as system "10." System 10 includes wireless device 12 and network node 14. Wireless device 12 includes transmitter circuitry 16 and receiver circuitry 18 for communicating with one or more elements system 10. In one or more embodiments, transmitter circuitry 16 and receiver circuitry 18 include and/or are replaced with communication interface.

Wireless device 12 includes processing circuitry 20. Processing circuitry 20 includes processor 22 and memory 24. In addition to a traditional processor and memory, processing circuitry 20 may comprise integrated circuitry for processing and/or control, e.g., one or more processors and/or processor cores and/or FPGAs (Field Programmable Gate Array) and/or ASICs (Application Specific Integrated Circuitry). Processor 22 may be configured to access (e.g., write to and/or reading from) memory 24, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory). Such memory 24 may be configured to store code executable by processor 22 and/or other data, e.g., environment generated data, data pertaining to communications, e.g., configuration and/or address data of nodes, etc.

Processing circuitry 20 may be configured to control any of the methods and/or processes described herein and/or to cause such methods, signaling and/or processes to be performed, e.g., by wireless device 12. Processor 22 corresponds to one or more processors 22 for performing wireless device 12 functions described herein. Wireless device 12 includes memory 24 that is configured to store data, programmatic software code and/or other information described herein. In one or more embodiments, memory 24 is configured to store first rate matching code 26. For example, first rate matching code 26 includes instructions that, when executed by processor 22, causes processor 22 to perform the functions described herein such as the functions described with respect to FIG. 12. In one or more embodiments, memory 24 is configured to store second rate matching code 27. For example, second rate matching code 27 includes instructions that, when executed by processor 22, causes processor 22 to perform the functions described herein such as the functions described with respect to FIG. 13.

Network node 14 includes transmitter circuitry 28 and receiver circuitry 30 for communicating with one or more elements system 10. In one or more embodiments, transmitter circuitry 28 and receiver circuitry 30 include and/or are replaced with communication interface. Network node 14 includes processing circuitry 32. Processing circuitry 32 includes processor 34 and memory 36. In addition to a traditional processor and memory, processing circuitry 32 may comprise integrated circuitry for processing and/or control, e.g., one or more processors and/or processor cores and/or FPGAs (Field Programmable Gate Array) and/or ASICs (Application Specific Integrated Circuitry). Processor 34 may be configured to access (e.g., write to and/or reading from) memory 36, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory). Such memory 36 may be configured to store code executable by processor 34 and/or other data, e.g., environment generated data, data pertaining to communications, e.g., configuration and/or address data of nodes, etc.

Processing circuitry 32 may be configured to control any of the methods and/or processes described herein and/or to cause such methods, signaling and/or processes to be performed, e.g., by network node 14. Processor 34 corresponds to one or more processors 34 for performing network node 14 functions described herein. Network node 14 includes memory 36 that is configured to store data, programmatic software code and/or other information described herein. In one or more embodiments, memory 36 is configured to store first configuration code 38. For example, first configuration code 38 includes instructions that, when executed by processor 34, causes processor 34 to perform the functions described herein such as the functions described with respect to FIG. 11. In one or more embodiments, memory 36 is configured to store second configuration code 40. For example, second configuration code 40 includes instructions that, when executed by processor 34, causes processor 34 to perform the functions described herein such as the functions described with respect to FIG. 14.

Those skilled in the art will appreciate that "cloud" computing generally refers to a type of on-demand network that provides access to a shared pool of configurable computing resources (e.g., networks, servers, storage, applications, services, etc.). The idea of resource pooling is an important elasticity characteristic of cloud computing, which enables resources to be mixed and matched to meet end-user needs. Cloud computing solutions provide both users and enterprises with the capability to store and process their data in data centers in various locations. The notion of "cloudlets" has also been proposed, as it relates to the mobile user's perspective. A cloudlet typically refers to a localized set of cloud resources available for use by nearby mobile devices. As described herein, the cloudlet refers to a processing location closer to the RBS while the cloud refers to a centralized processing location further away from the RBS.

Figure 9:
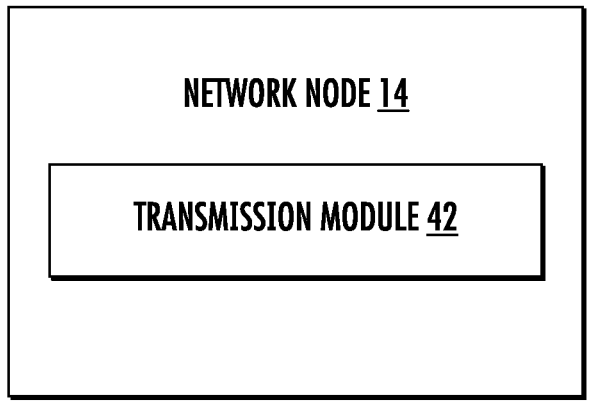
FIG. 9 is an alternative embodiment of network node in accordance with the principles of some embodiments of the disclosure.

FIG. 9 is an alternative embodiment of network node 14 in accordance with the principles of some embodiments of the disclosure. Network node 14 includes transmission module 42 that is configured to transmit signaling, as described herein. In one or more embodiments, the signaling includes downlink control information (DCI) that indicates rate matching for LTE wireless device 12 and NR wireless device 12.

Figure 10:
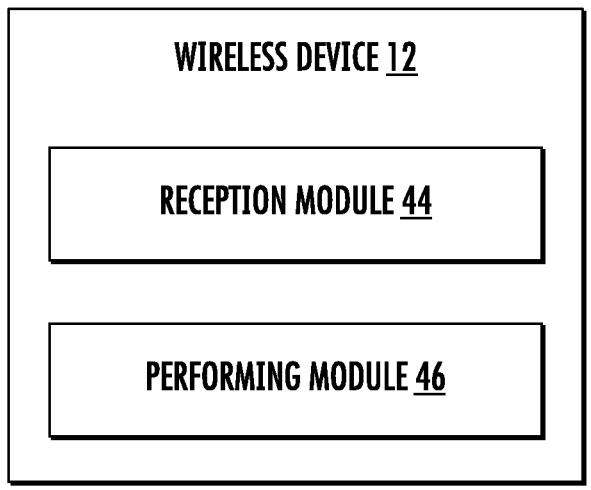
FIG. 10 is an alternative embodiment of wireless device in accordance with the principles of some embodiments of the disclosure.

FIG. 10 is an alternative embodiment of wireless device 12 in accordance with the principles of some embodiments of the disclosure. Wireless device 12 includes reception module 44 that is configured to receiving signaling, as described herein. Wireless device 12 includes performing module 46 that is configured to perform rate matching based on the DCI, as described herein.

Figure 11:
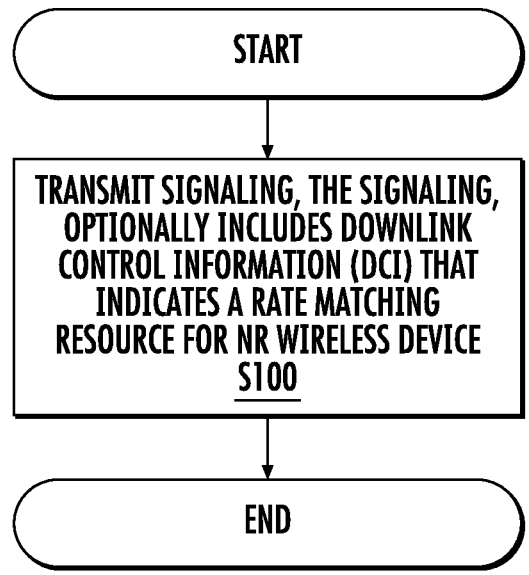
FIG. 11 is a flow diagram of an example configuration process of first configuration code in accordance with the principles of some embodiments of the disclosure.

FIG. 11 is a flow diagram of an example configuration process of first configuration code 38 in accordance with the principles of some embodiments of the disclosure. Processing circuitry 32 is configured to transmit signaling, as described herein (Block S100). The signaling includes downlink control information (DCI) that indicates rate matching for LTE wireless device 12 and NR wireless device 12.

Figure 12:
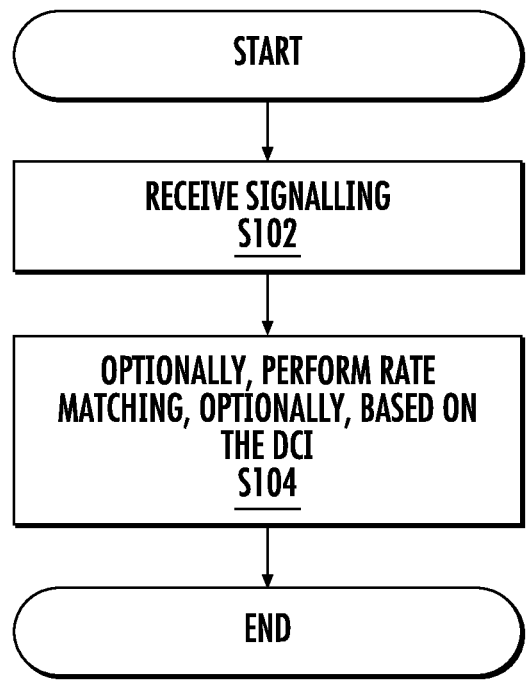
FIG. 12 is a flow diagram of an example first rate matching code in accordance with the principles of some embodiments of the disclosure.

FIG. 12 is a flow diagram of an example first rate matching code 26 in accordance with the principles of some embodiments of the disclosure. Processing circuitry 20 is configured to receive signaling, as described herein (Block S102). The signaling includes downlink control information (DCI) that indicates rate matching for LTE wireless device 12 and NR wireless device 12. Processing circuitry 20 is configured to perform rate matching based on the DCI, as described herein (Block S104).

Figure 13:
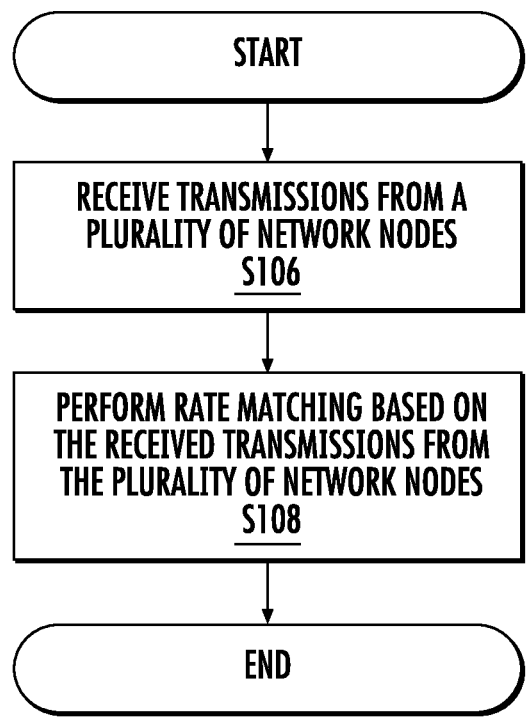
FIG. 13 is a flow diagram of an example rate matching process of second rate matching code in accordance with the principles of some embodiments of the disclosure.

FIG. 13 is a flow diagram of an example rate matching process of second rate matching code 27 in accordance with the principles of some embodiments of the disclosure. Processing circuitry 20 is configured to receive transmissions from a plurality of network nodes 14, as described herein (Block S106). At least one of the network nodes 14 serves both NR wireless device 12 and at least one LTE wireless device 12 using at least part of a system bandwidth. Processing circuitry 20 is configured to perform rate matching based on the received transmissions from the plurality of network nodes, as described herein (Block S108).

Figure 14:
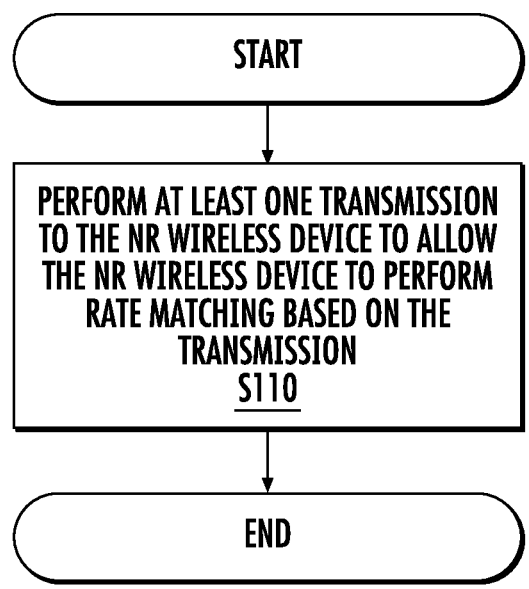
FIG. 14 is a flow diagram of an example configuration process of second configuration code in accordance with the principles of some embodiments of the disclosure.

FIG. 14 is flow diagram of an example configuration process of second configuration code 40 in accordance with the principles of some embodiments of the disclosure. Processing circuitry 32 is configured to perform at least one transmission to the NR wireless device to allow the NR wireless device to perform rate matching based on the transmission, as described herein (Block S110).

Figure 15:
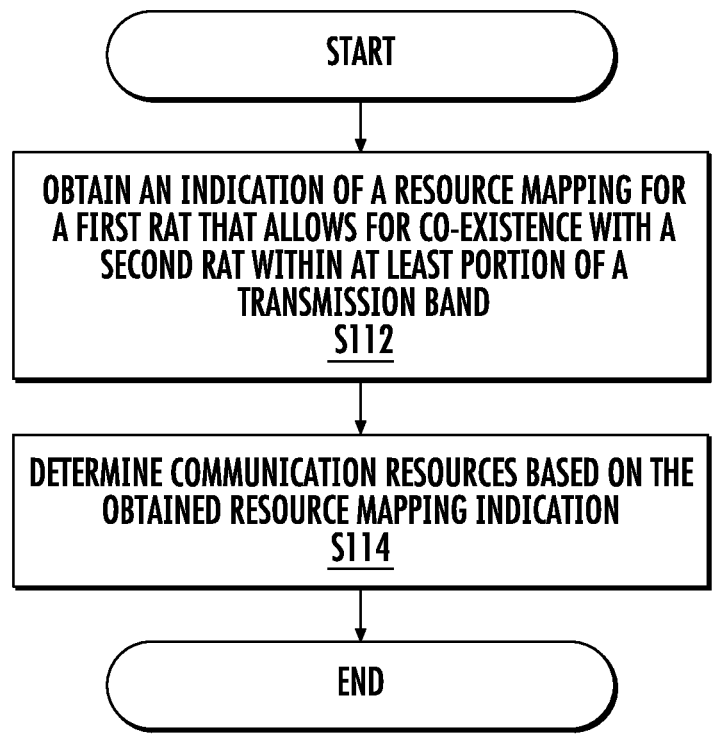
FIG. 15 is a flowchart of an exemplary process in a wireless device according to principles set forth herein.

FIG. 15 is a flowchart of an exemplary process in a user equipment wireless device 12 according to principles set forth herein. The process includes obtaining, via processing circuitry 20, an indication of a resource mapping for a first radio access technology, RAT, that allows for co-existence with a second RAT within at least a portion of a transmission band (block S112). The process also includes determining, via the processing circuitry 20, communication resources based on the obtained resource mapping indication (block S114).

Figure 16:
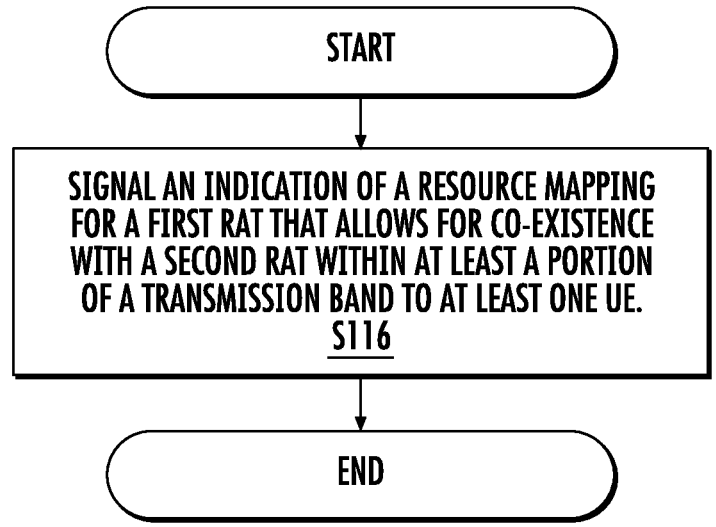
FIG. 16 is a flowchart of an exemplary process in network node according to principles set forth herein.

FIG. 16 is a flowchart of an exemplary process in a base station network node 14 according to principles set forth herein. The process includes signaling, via the processing circuitry 32, an indication of a resource mapping for a first radio access technology, RAT, that allows for co-existence with a second RAT within at least a portion of a transmission band (block S116), to at least one user equipment, UE 12.

Having described the general process flow of arrangements of the disclosure and providing examples of hardware and software arrangements for implementing the processes and functions of the disclosure, the sections below provide details and examples of arrangements for rate matching using dynamically indicated reference signals in co-carrier co-existence scenario.

Embodiments According to a First Aspect of the Disclosure

In this embodiment, NR wireless device 12 is configured with a zero power reference signal (ZP-RS) configuration which consists of multiple ZP-RS resources to be used to determine the correct PDSCH RE mapping. The time frequency resource elements in the ZP-RS resources are configured to NR wireless device 12 such that the REs included in each of the ZP-RS resource take into account different combinations of the aperiodic CSI-RS patterns configured to the LTE wireless devices 12 (which are deployed with frequency-overlapping carriers with NR) and other NR wireless devices 12. Depending on which combination of Aperiodic CSI-RS patterns are triggered in the LTE wireless devices 12 or other NR wireless devices 12, the appropriate ZP-RS resource will be indicated via dynamic signaling to NR wireless device 12 for the purpose of performing PDSCH RE mapping. When the NR wireless device 12 is indicated with one of the aperiodic ZP-RS resources, the NR wireless device 12 will avoid the REs included in the dynamically signaled ZP-RS resource during PDSCH RE mapping. Since the ZP-RS resource indicated is used for the purpose of PDSCH RE mapping or rate matching, the ZP-RS resource can alternatively be referred to as a rate matching resource.

Figure 17:
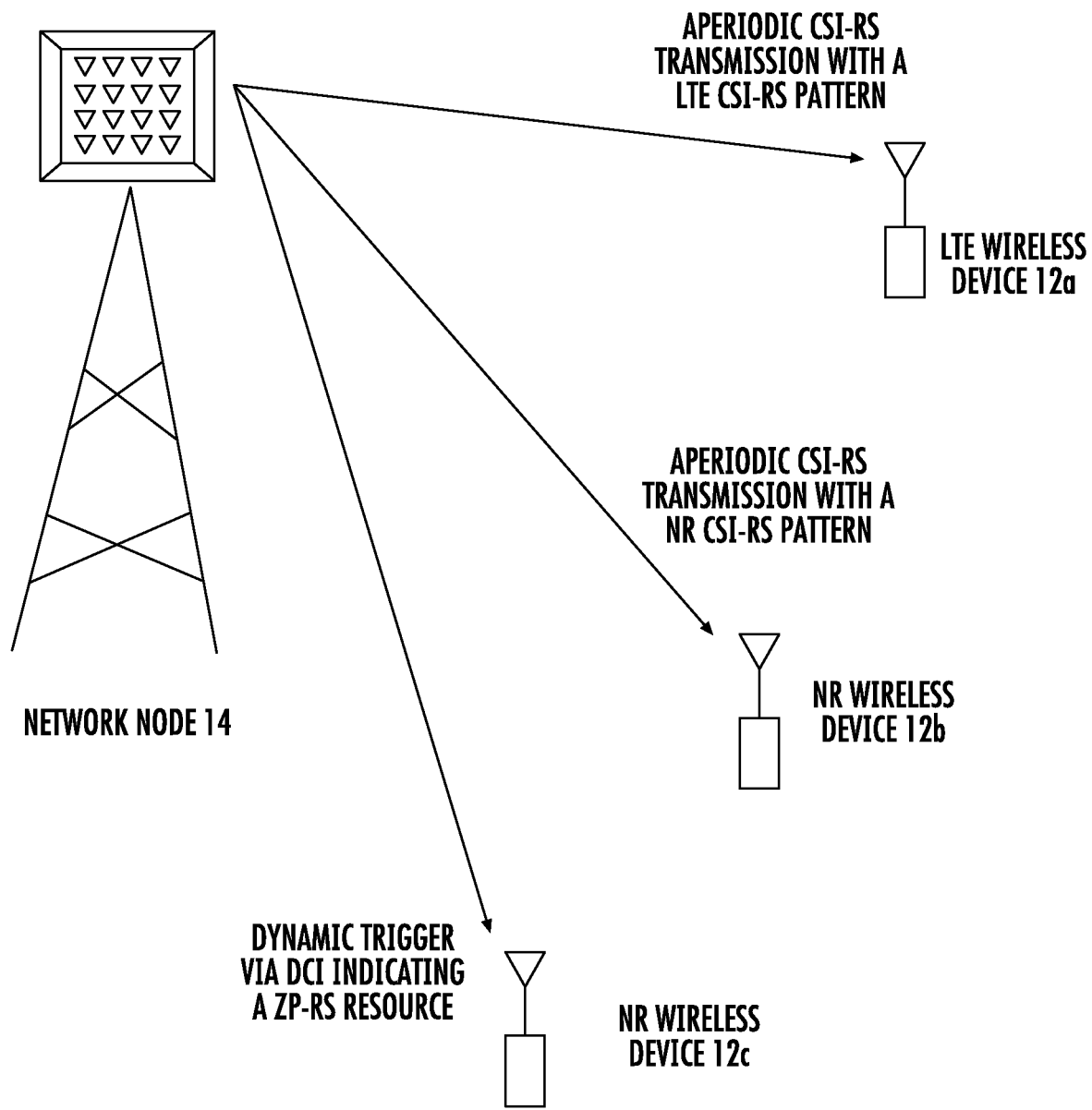
FIG. 17 is a diagram of system where a ZP-RS resource for PDSCH RE mapping is indicated to NR wireless devices.

An example of this embodiment is illustrated in FIG. 17 that is a diagram of system 10 where a ZP-RS resource for PDSCH RE mapping is indicated to NR wireless devices 12a, 12b and 12c. In this example, LTE wireless device 12a is triggered with an aperiodic CSI-RS transmission via DCI where the CSI-RS pattern belongs to an LTE CSI-RS pattern in a given slot. Similarly, in the same given slot, NR wireless device 12b is triggered with an aperiodic CSI-RS transmission via DCI where the CSI-RS pattern can be different from the LTE CSI-RS pattern. In this example, NR wireless device 12c is scheduled for PDSCH transmission in the same given slot. Along with the trigger where PDSCH resources are granted (also known as a downlink grant), network node 14 dynamically indicates via DCI one of the configured ZP-RS resources in the same given slot. The REs in the dynamically indicated ZP-RS resource includes the REs used in the aperiodic CSI-RS transmission to LTE wireless device 12a and the REs used in the aperiodic CSI-RS transmission to NR wireless device 12b.

Figure 18:
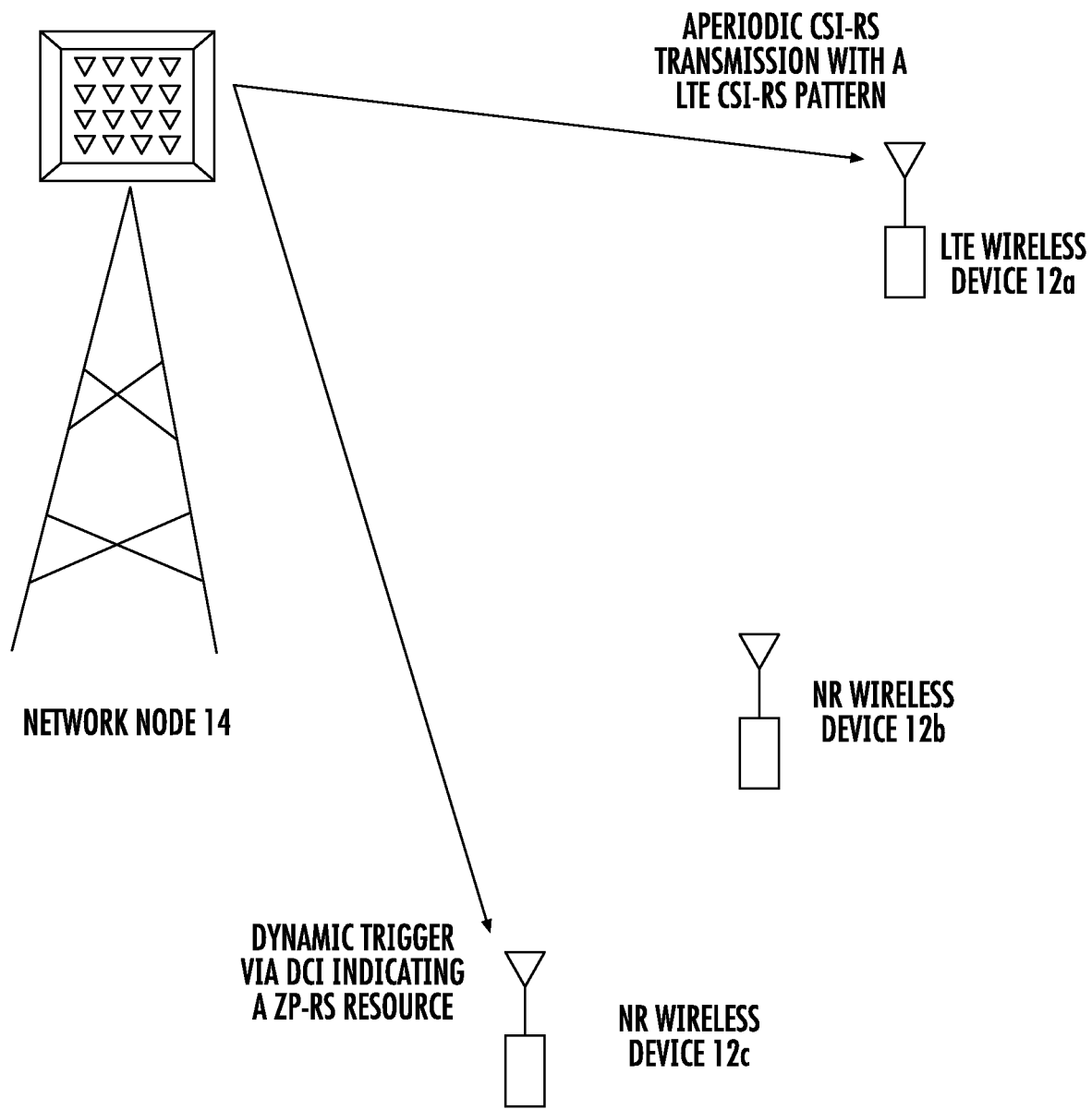
FIG. 18 is a diagram of a second example of an embodiment for triggering an aperiodic CSI-RS.

A second example of this embodiment is illustrated in FIG. 18. In this example, LTE wireless device 12a is triggered with an aperiodic CSI-RS transmission via DCI where the CSI-RS pattern belongs to an LTE CSI-RS pattern in a slot. The NR wireless device 12b is configured with aperiodic CSI-RS but there is no aperiodic CSI-RS transmission in the same slot. In this example, the NR wireless device 12c is scheduled for PDSCH transmission in the same slot. Along with the trigger where PDSCH resources are granted (also known as a downlink grant), the network node 14 dynamically triggers via DCI one of the configured ZP-RS resources in the same slot. The REs in the dynamically triggered ZP-RS resource includes the REs used in the aperiodic CSI-RS transmission to LTE wireless device 12a.

Figure 19:
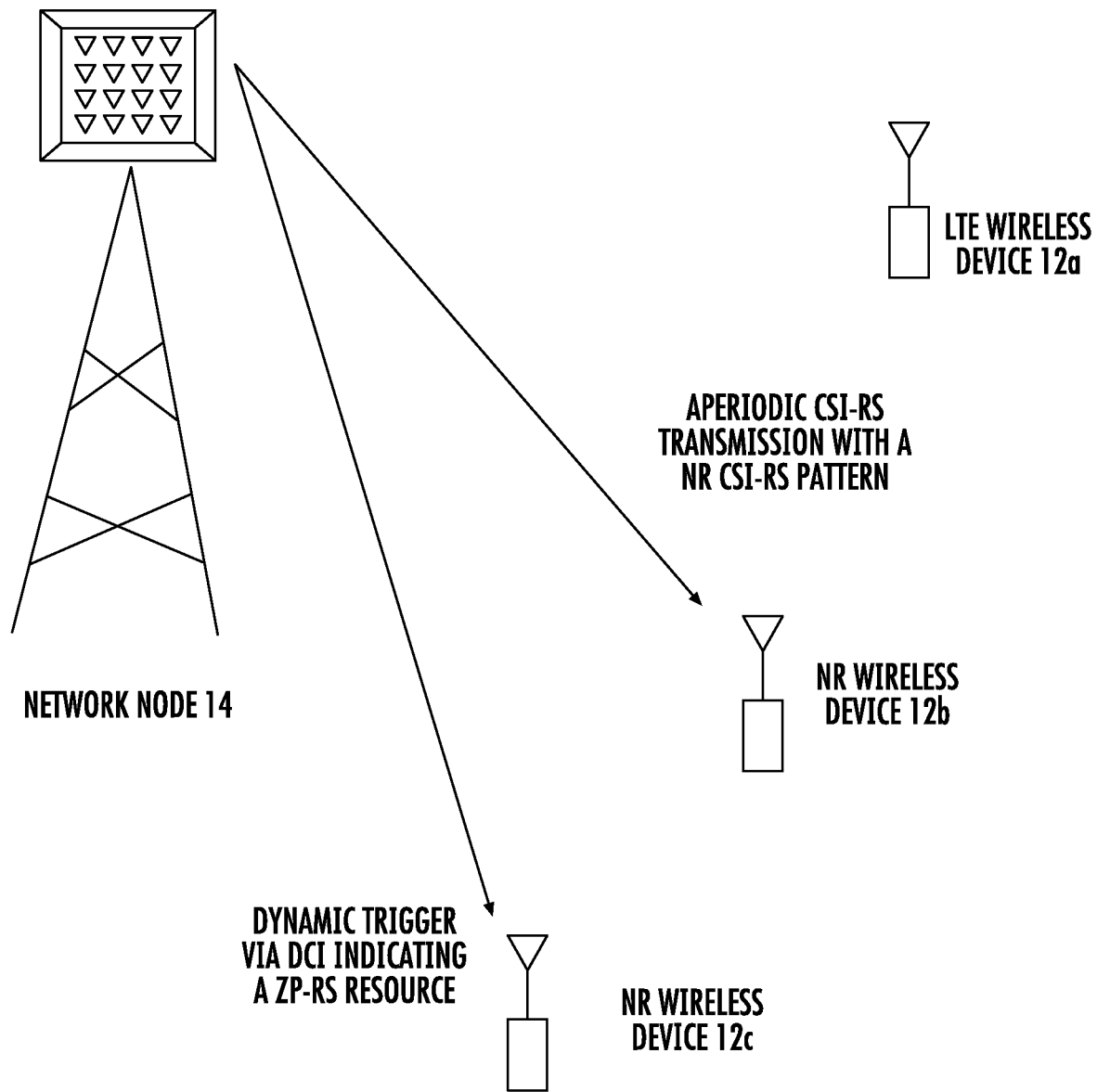
FIG. 19 is a third example of an embodiment for triggering an aperiodic CSI-RS.

A third example of this embodiment is illustrated in FIG. 19. In this example, LTE wireless device 12 is configured for aperiodic CSI-RS transmission, but there is no aperiodic CSI-RS in a slot. In the same slot, NR wireless device 12b is triggered with an aperiodic CSI-RS transmission via DCI where the CSI-RS pattern can be different from the LTE CSI-RS pattern. In this example, NR wireless device 12c is scheduled for PDSCH transmission in the same slot. Along with the trigger where PDSCH resources are granted (also known as a downlink grant), network node 14 dynamically triggers via DCI one of the configured ZP-RS resources in the same slot. The REs in the dynamically triggered ZP-RS resource includes the REs used in the aperiodic CSI-RS transmission to NR wireless device 12b.

In one variant of this embodiment, the NR wireless device 12 is configured with more than one (i.e., multiple) ZP-RS configuration with each ZP-RS configuration consisting of multiple ZP-RS resources to be used to determine the correct PDSCH RE mapping. Since the ZP-RS configurations are used for the purpose of PDSCH RE mapping or rate matching, the ZP-RS configurations can alternatively be referred to as rate matching resource configurations. The time frequency resource elements in the ZP-RS resources are configured to the NR wireless device 12 such that the REs included in each of the ZP-RE resource within a ZP-RS configuration take into account different combinations of the aperiodic CSI-RS patterns that are activated in LTE wireless devices 12 (which are deployed with frequency-overlapping carriers with NR) and the aperiodic CSI-RS patterns configured to other NR wireless devices 12. Since LTE supports activation/deactivation of N out of K aperiodic CSI-RS resources configured, each of the ZP-RS configurations configured to NR wireless device 12 can consist of ZP-RS resources with time frequency resource elements that take into account a certain N out of K aperiodic CSI-RS resources configured to the LTE wireless devices 12. This way when the activated aperiodic CSI-RS resources in LTE wireless devices 12 are changed via MAC CE activation/deactivation, the network node 14 can dynamically signal one of the multiple ZP-RS configurations to NR wireless device 12 where the dynamically indicated ZP-RS configuration contains ZP-RS resources with time frequency resource elements that take into account the changed activated aperiodic CSI-RS resources in the LTE wireless device 12. This dynamic indication of ZP-RS configuration to the NR wireless device 12 can be done via either MAC CE or DCI. Furthermore, depending on which combination of aperiodic CSI-RS patterns are triggered among the activated CSI-RS resources in LTE wireless devices 12 and on which combination of aperiodic CSI-RS patterns are triggered among the other NR wireless devices 12, the appropriate ZP-RS resource will be indicated via dynamic signaling to NR wireless device 12 for the purpose of performing PDSCH RE mapping. When the NR wireless device 12 is indicated with one of the aperiodic ZP-RS resources, the NR wireless device 12 will avoid the REs included in the dynamically signaled ZP-RS resource during PDSCH RE mapping.

In some cases, only part of a carrier bandwidth is shared with LTE wireless devices. In these cases, the ZP-RS resource associated with LTE CSI-RS may apply to only the part of bandwidth shared with LTE wireless devices 12. Similarly, the ZP-RS resource associated with NR CSI-RS may apply to the part of bandwidth that are not shared with LTE wireless devices 12.

Embodiments According to a Second Aspect of the Disclosure

In another embodiment, the NR wireless device 12 receives PDSCH data from multiple Transmission Receptions Points (TRPs), e.g., network nodes 14, and some of the TRPs are also serving LTE wireless devices 12 using the whole or part of the system bandwidth. It is generally transparent to the NR wireless device 12 about which TRP the data is sent from. When NR wireless device 12 is scheduled with the PDSCH in a subframe or slot, the NR wireless device 12 may also be dynamically signaled on whether LTE reference signals are present in the subframe or slot and if present, a rate matching resource configuration is also signaled for the PDSCH rate matching in the subframe or slot. The rate matching resource configuration is one of multiple rate matching resource configurations semi-statically configured for the NR wireless device 12, where each configuration contains information about REs occupied by LTE reference signals as well as REs occupied by NR reference signals in the subframe or slot.

Figure 20:
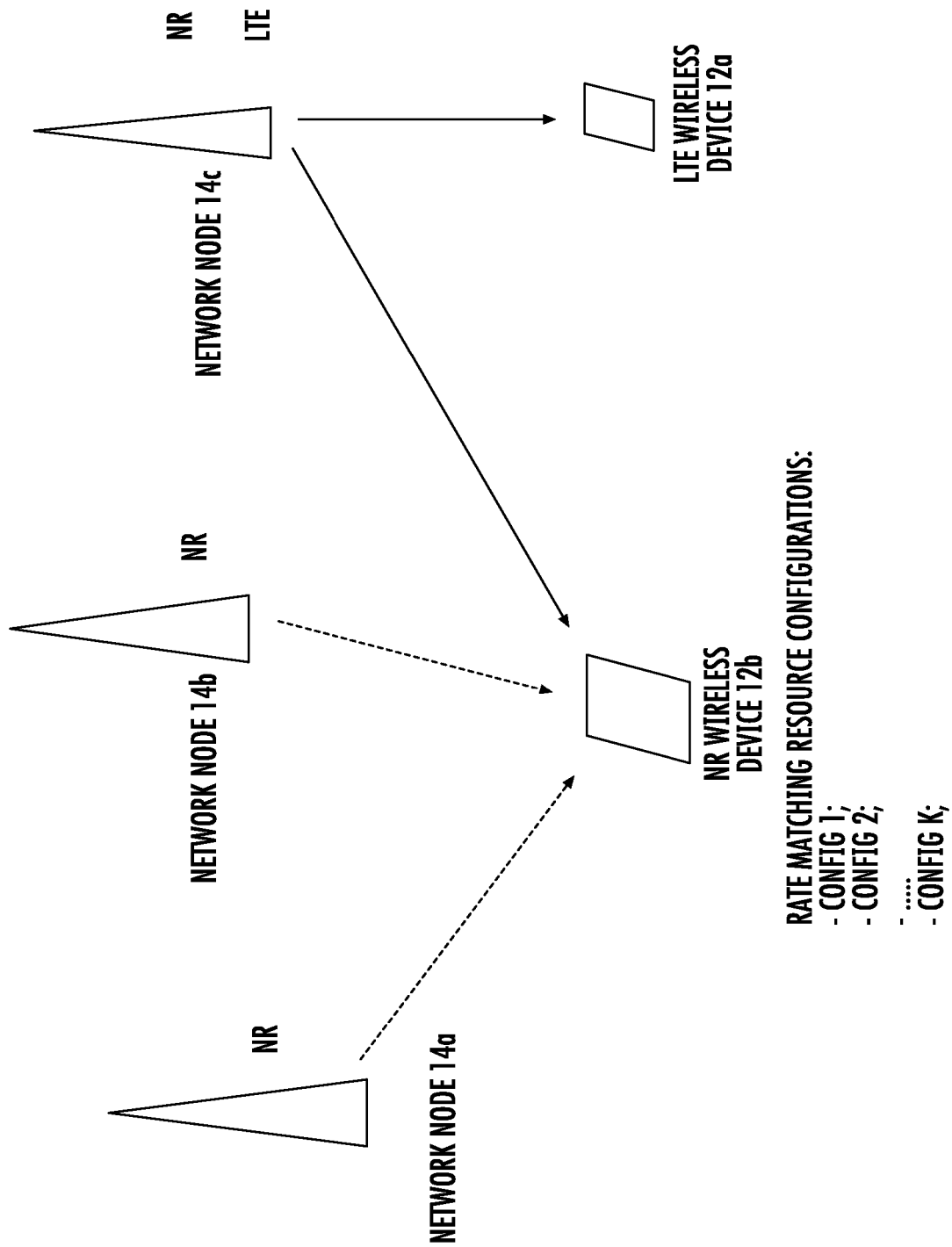
FIG. 20 is a block diagram of PDSCH transmission from multiple network nodes to a NR wireless device.

An example is shown in FIG. 20 that is a block diagram of a PDSCH transmission from multiple network nodes 14 to the NR wireless device 12, where the NR wireless device 12 receives PDSCH data from any one of the three network nodes 14a-14c, e.g., TRPs, and network node 14c is also shared with LTE wireless device 12a on the same carrier. When the NR wireless device 12b receives the PDSCH from the network node 14c, some REs are occupied by LTE reference signals and those REs or a super set that contains those REs need to be signaled to the NR wireless device 12b if the PDSCH is scheduled on the whole or part of the LTE band. The NR wireless device 12b may be semi-statically configured with K rate matching resource configurations and one of the configurations contains information of the LTE reference signal REs in network node 14c. The configuration can be dynamically signaled to the NR wireless device 12b based on which network node the PDSCH is transmitted from and what REs are occupied by reference signals (both NR and LTE) in the PDSCH subframe or slot. The reference signals can include periodic CSI-RS, semi-persistent CSI-RS, aperiodic CSI-RS, or LTE CRS.

Some additional Embodiments are as follows:

A First Aspect of the Disclosure

Embodiment 1A

A method of PDSCH RE mapping in a first NR wireless device in an NR-LTE co-existence scenario where the first NR wireless devices and LTE wireless devices share at least part of the transmission band, where the method comprises at least one of:

transmission of aperiodic CSI-RS to a LTE wireless device that shares the channel with the NR wireless device; and transmission of aperiodic CSI-RS to a second NR wireless device; and Signaling of a ZP-CSI-RS configuration to the first NR wireless device.

Embodiment 1AA

The method of Embodiment 1A, the PDSCH RE mapping considering transmission of aperiodic CSI-RS.

Embodiment 2A

Method of Embodiment 1A where the ZP-RS resource configuration which consists multiple ZP-RS resources is used to determine the correct PDSCH RE mapping.

Embodiment 3A

Method of any one of Embodiments 1A-2A, the time frequency resource elements in the ZP-RS resources are configured to the NR wireless device such that the REs included in each of the ZP-RS resource take into account different combinations of the Aperiodic CSI-RS patterns configured to the LTE wireless device and the second NR wireless device.

Embodiment 4A

Method of any one of Embodiment 1A-3A, where one of the ZP-RS resources is indicated via dynamic signaling to the first NR wireless device for the purpose of performing PDSCH RE mapping.

Embodiment 5A

Method of Embodiment 4, where the dynamic signaling is performed by DCI.

A Second Aspect of the Disclosure

Embodiment 6A

A method of PDSCH RE mapping in an NR wireless device where the PDSCH RE mapping considering transmissions from multiple TRPs where some of the TRPs are also serving one or more LTE wireless devices using the whole or part of the system bandwidth.

Embodiment 7A

Method of Embodiment 6A where multiple rate matching configurations are semi-statically configured to the NR wireless device which are used to determine the correct PDSCH RE mapping.

Embodiment 8A

Method of any one of Embodiments 6A-7A, each of the rate matching configurations contains information about REs occupied by LTE reference signals and/or REs occupied by NR reference signals from one or more TRPs.

Embodiment 9A

Method of Embodiment 6A-8A, where one of the rate matching configurations is indicated via dynamic signaling to the NR wireless device for the purpose of performing PDSCH RE mapping.

Embodiment 10A

Method of Embodiment 9A, where the dynamic signaling is performed by DCI.

Other Embodiments

1. A network node for rate matching in a New Radio (NR) wireless device, the NR wireless device sharing at least part of a transmission band with a Long Term Evolution (LTE) wireless device, the network node comprising:
processing circuitry including a memory and a processor, the processing circuitry is configured to:
transmit signaling that indicates rate matching for the LTE wireless device and the NR wireless device, wherein, optionally, the signaling includes downlink control information (DCI).

2. The network node of Embodiment 1, wherein the signaling includes a first aperiodic CSI-RS transmission via DCI including a channel state information reference signal (CSI-RS) pattern that correspond to an LTE CSI-RS pattern in a slot.

3. The network node of Embodiment 2, wherein the signaling includes a second aperiodic CSI-RS transmission via the DCI including a CSI-RS pattern that correspond to an NR CSI-RS pattern in the slot.

7. A New Radio (NR) wireless device for rate matching, the NR wireless device sharing at least part of a transmission band with a Long Term Evolution (LTE) wireless device, the NR wireless device comprising:
processing circuitry including a memory and a processor, the processing circuitry is configured to:
receive signaling that indicates rate matching for the LTE wireless device and the NR wireless device, wherein, optionally, the signaling includes downlink control information (DCI); and
optionally, perform rate matching, optionally based on the DCI.

8. The NR wireless device of Embodiment 7, wherein the rate matching is based on a common zero power reference signal (ZP-RS) resource configuration including a plurality of ZP-RS resources.

9. The NR wireless device of Embodiment 8, wherein the ZP-RS resources including time-frequency resource elements, the time-frequency resource elements included in each of the ZP-RS resource taking into account different combinations of an aperiodic channel state information reference signal (CSI-RS) pattern configured for the LTE wireless device and the NR wireless device.

13. A New Radio (NR) wireless device for rate matching, the wireless device comprising:
processing circuitry including a memory and a processor, the processing circuitry is configured to:
receiving transmissions from a plurality of network nodes, at least one of the network nodes serving both NR wireless device and at least one Long Term Evolution (LTE) wireless device using at least part of a system bandwidth;
perform rate matching based on the received transmissions from the plurality of network nodes.

14. The NR wireless device of Embodiment 13, wherein the at least one transmission includes multiple rating matching configurations that are semi-statically configured to the NR wireless device.

15. The NR wireless device of any one of Embodiments 13-14, wherein each of the rate matching configurations are semi-statically configured to the NR wireless device.

16. The NR wireless device of any one of embodiments 13-15, wherein the rate matching configurations contains information about REs occupied by at least one taken from a group consisting of LTE reference signals and REs occupied by NR reference signals from at least one network node.

17. The NR wireless device of any one of embodiments 13-16, wherein at least one rate matching configuration is indicated via dynamic signaling.

18. The NR wireless device of any one of embodiments 17, wherein the dynamic signaling is performed by DCI.

25. A network node for rate matching, the network node serving both a New Radio (NR) wireless device and at least one Long Term Evolution (LTE) wireless device using at least part of a system bandwidth, the network node comprising:
processing circuitry including a memory and a processor, the processing circuitry is configured to:
perform at least one transmission to the NR wireless device to allow the NR wireless device to perform rate matching based on the transmission.

26. The network node of Embodiment 25, wherein the transmission includes multiple rating matching configurations that are semi-statically configured to the NR wireless device.

27. The network node of any one of Embodiments 25-26, wherein each of the rate matching configurations are semi-statically configured to the NR wireless device.

28. The network node of any one of embodiments 25-27, wherein the rate matching configurations contains information about REs occupied by at least one taken from a group consisting of LTE reference signals and REs occupied by NR reference signals from at least one network node.

29. The network node of any one of embodiments 25-28, wherein at least one rate matching configuration is indicated via dynamic signaling.

30. The network node of any one of embodiments 29, wherein the dynamic signaling is performed by DCI. As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object-oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the present embodiments are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A user equipment, UE, comprising processing circuitry configured to:
   obtain an indication of a resource mapping for a first radio access technology, RAT, that allows for mapping around a second RAT within at least a portion of a transmission band;
   determine communication resources based on the obtained resource mapping indication, the indication being a first indication;
   obtain at least one additional indication of at least one resource mapping for the first radio access technology, RAT, that allows for co-existence with the second RAT within the transmission band; and
   resource map a physical downlink shared channel, PDSCH, around zero power reference signal, ZP-RS, resources, during the resource mapping.

2. The UE of claim 1, wherein the transmission band is a carrier of the first RAT.

3. The UE of claim 1, wherein the first RAT is New Radio, NR and the second RAT is Long Term Evolution, LTE.

4. The UE of claim 1, wherein the UE is a New Radio, NR, UE.

5. The UE of claim 1, wherein the determined communication resources are physical downlink shared channel, PDSCH, resources.

6. The UE of claim 1, wherein the obtained resource mapping indication is based on transmissions received from a plurality of base stations.

7. The UE of claim 1 wherein the processing circuitry is further configured to receive dynamic signaling indicating a use of zero-power reference signal, ZP-RS, which allows resource mapping in a subframe around a Long Term Evolution, LTE, reference signal that may be present in the subframe.

8. The UE of claim 1, wherein the indication of resource mapping is received in downlink control information, DCI.

9. The user equipment of claim 1, wherein the first indication and the at least one additional indication of at least one resource mapping correspond to at least one Long Term Evolution cell-specific reference signal, LTE CRS, pattern.

10. The user equipment of claim 1, wherein the first indication and the at least one additional indication of at least one resource mapping correspond to at least one periodic cell-specific reference signal, CSI-RS, pattern.

11. The user equipment of any of claim 1, wherein the additional indications correspond to transmissions from at least one additional base station distinct from a first base station transmitting the first indication.

12. A method for a user equipment, UE, the method comprising:
- obtaining an indication of a resource mapping for a first radio access technology, RAT, that allows for mapping around a second RAT within at least a portion of a transmission band;
- determining communication resources based on the obtained resource mapping indication, the indication being a first indication;
- obtaining at least one additional indication of at least one resource mapping for the first radio access technology, RAT, that allows for co-existence with the second RAT within the transmission band; and
- resource mapping a physical downlink shared channel, PDSCH, around zero power reference signal, ZP-RS, resources, during the resource mapping.

13. The method of claim 12, wherein the transmission band is a carrier of the first RAT.

14. The method of claim 12, wherein the first RAT is New Radio, NR and the second RAT is Long Term Evolution, LTE.

15. The method of claim 12, wherein the UE is a New Radio, NR, UE.

16. The method of claim 12, wherein the determined communication resources are physical downlink shared channel, PDSCH, resources.

17. The method of claim 12, wherein the obtained resource mapping indication is based on transmissions received from a plurality of base stations.

18. The method of claim 12, further comprising receiving dynamic signaling indicating a use of zero-power reference signal, ZP-RS, which allows resource mapping in a subframe around a Long Term Evolution, LTE, reference signal that may be present in the subframe.

19. The method of claim 12, wherein the indication of resource mapping is received in downlink control information, DCI.

* * * * *